(12) United States Patent
Ito et al.

(10) Patent No.: US 9,053,388 B2
(45) Date of Patent: Jun. 9, 2015

(54) IMAGE PROCESSING APPARATUS AND METHOD, AND COMPUTER-READABLE STORAGE MEDIUM

(75) Inventors: Yoshinori Ito, Tokyo (JP); Masami Kato, Sagamihara (JP); Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 816 days.

(21) Appl. No.: 12/901,364

(22) Filed: Oct. 8, 2010

(65) Prior Publication Data

US 2011/0091113 A1  Apr. 21, 2011

(30) Foreign Application Priority Data

Oct. 19, 2009 (JP) ................................ 2009-240874

(51) Int. Cl.
*G06K 9/68* (2006.01)
*G06K 9/62* (2006.01)
*G06K 9/00* (2006.01)
*G06T 3/00* (2006.01)

(52) U.S. Cl.
CPC .......... *G06K 9/6206* (2013.01); *G06K 9/00248* (2013.01); *G06T 3/0093* (2013.01); *G06K 9/00315* (2013.01)

(58) Field of Classification Search
CPC .................................................. G06K 9/6206
See application file for complete search history.

(56) References Cited

U.S. PATENT DOCUMENTS 5,508,823 A    4/1996  Kiyohara et al.
7,039,233 B2   5/2006  Mori et al.
7,142,697 B2 * 11/2006 Huang et al. ................. 382/118
7,699,423 B2   4/2010  Suwa et al.
8,213,690 B2 * 7/2012  Okada et al. ................. 382/118

(Continued)

FOREIGN PATENT DOCUMENTS

| JP | 10-293840 A    | 11/1998 |
| JP | 2002-358500 A  | 12/2002 |
| JP | 2007-034724 A  | 2/2007  |
| JP | 2009-211178 A  | 9/2009  |

OTHER PUBLICATIONS

Ashraf, et al., "Learning Patch Correspondences for Improved Viewpoint Invariant Face Recognition", IEEE International Conference on Computer Vision and Pattern Recognition, Jun. 2008.

(Continued)

*Primary Examiner* — Samir Ahmed
(74) *Attorney, Agent, or Firm* — Fitzpatrick, Cella, Harper & Scinto

(57) ABSTRACT

An image processing apparatus classifies a variation of a target object included in an image from a specific state as one of a plurality of types of attributes, and holds, for each variation attribute, a correction parameter for spatial transformation that corrects the target object to the specific state. The image processing apparatus generates an input image vector by vectorizing at least a partial region of the input image, and determines a variation attribute by detecting a variation of the target object from the specific state in the input image. Then, the image processing apparatus generates a transformed image vector by performing the spatial transformation on the input image vector, using a correction parameter selected based on the determined variation attribute from among the correction parameters held for respective variation attributes.

17 Claims, 20 Drawing Sheets

(56) References Cited

U.S. PATENT DOCUMENTS

| | | | |
|---|---|---|---|
| 2003/0169906 A1* | 9/2003 | Gokturk et al. | 382/115 |
| 2005/0238209 A1* | 10/2005 | Ikeda et al. | 382/118 |
| 2006/0228005 A1 | 10/2006 | Matsugu et al. | |
| 2007/0053590 A1* | 3/2007 | Kozakaya | 382/181 |
| 2008/0002862 A1* | 1/2008 | Matsugu et al. | 382/115 |
| 2008/0130961 A1* | 6/2008 | Kinoshita | 382/118 |
| 2008/0205712 A1* | 8/2008 | Ionita et al. | 382/118 |
| 2009/0157707 A1 | 6/2009 | Ito et al. | |
| 2010/0180189 A1 | 7/2010 | Ito et al. | |
| 2010/0209010 A1 | 8/2010 | Kato et al. | |

OTHER PUBLICATIONS

Lucas, et al., "An Iterative Image Registration Technique with an Application to Stereo Vision", Proceedings of Imaging Understanding Workshop, pp. 121-130, 1981.

Yoshihisa, et al., "Face Recognition based on Local region Extraction according to Facial Orientation", Proceedings of 13th Symposium on Sensing via Image Information, Jun. 2007.

Viola, et al., "Rapid Object Detection Using a Boosted Cascade of Simple Features", Proceedings of IEEE Conference on Computer Vision and Pattern Recognition, vol. 1, pp. 511-518, Dec. 2001.

U.S. Appl. No. 12/974,633, filed Dec. 21, 2010, Applicants: Masami Kato, et al.

U.S. Appl. No. 12/966,725, filed Dec. 13, 2010, Applicants: Takahisa Yamamoto, et al.

U.S. Appl. No. 12/899,387, filed Oct. 6, 2010, Applicants: Masami Kato, et al.

U.S. Appl. No. 12/873,159, filed Aug. 31, 2010, Applicants: Yoshinori Ito, et al.

Japanese Office Action dated Aug. 19, 2013 in Japanese Patent Application No. 2009-240874.

\* cited by examiner

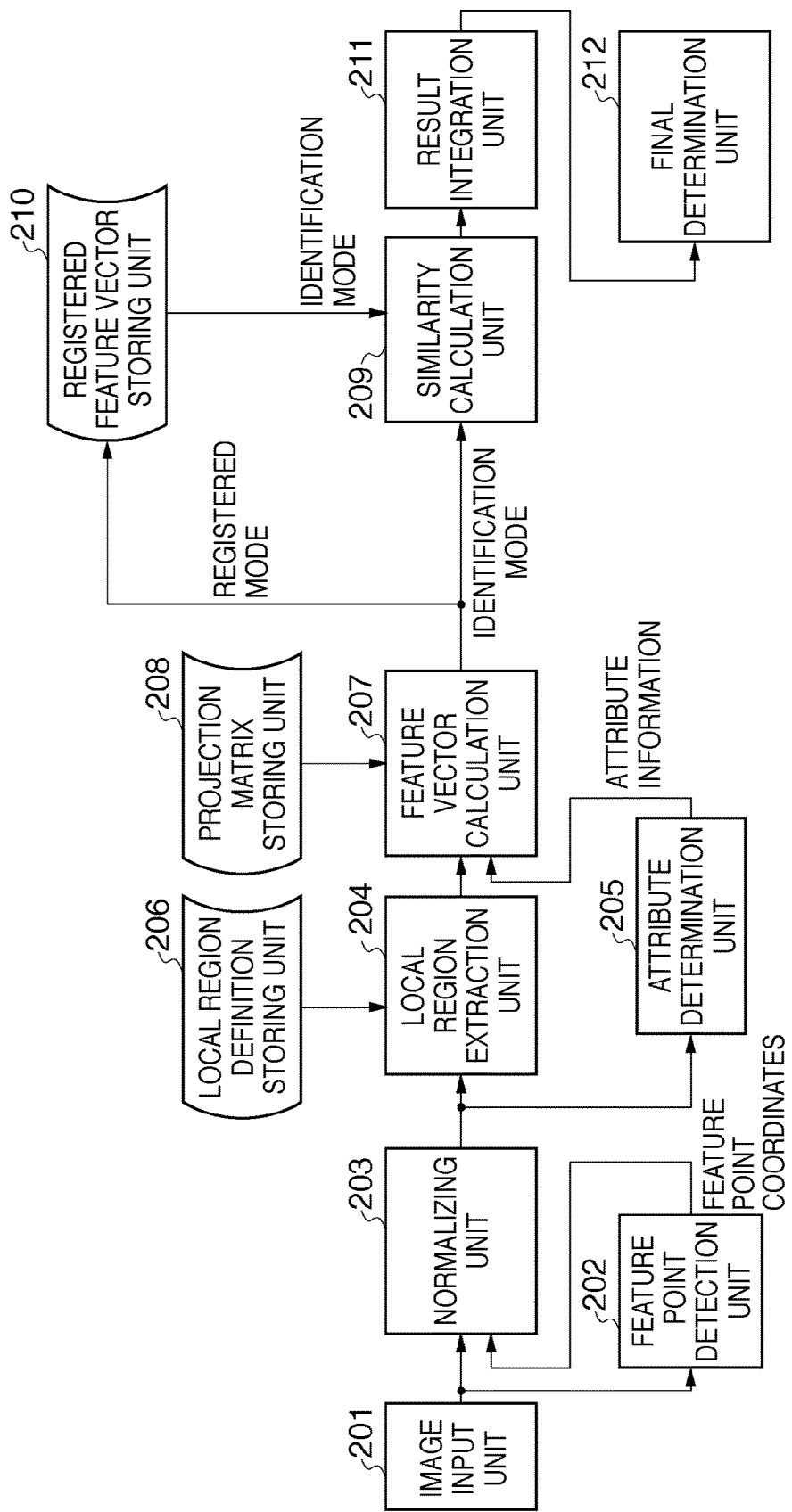

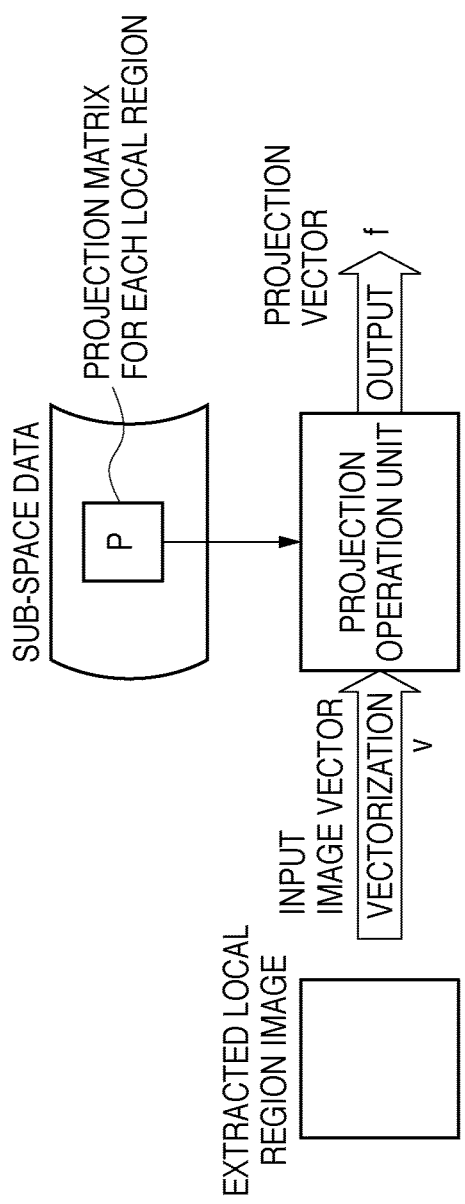

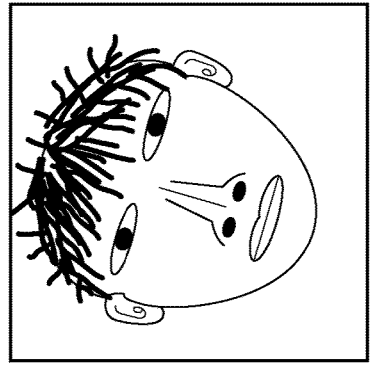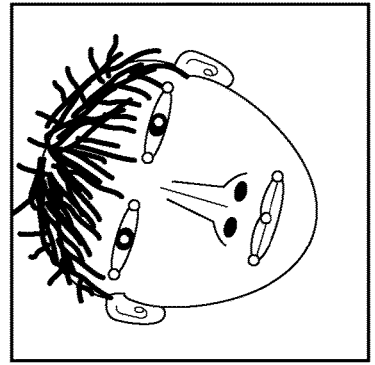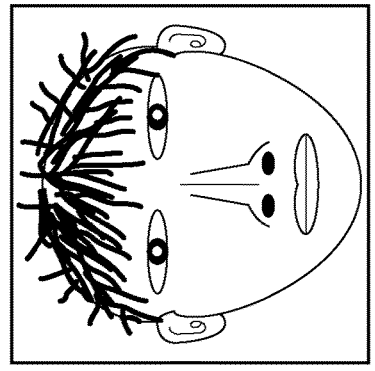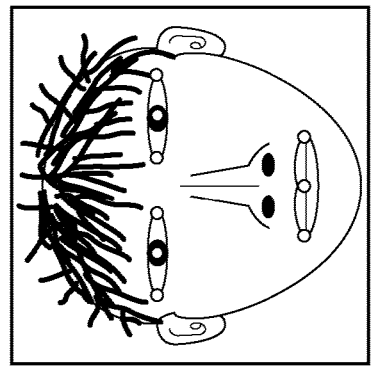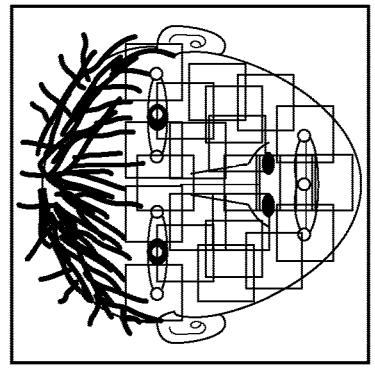

FIG. 9
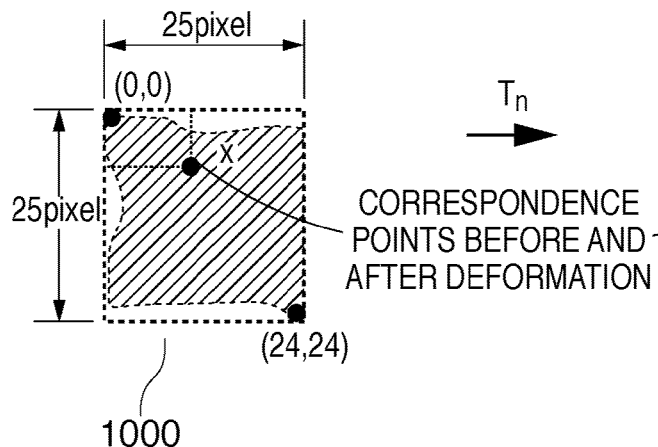
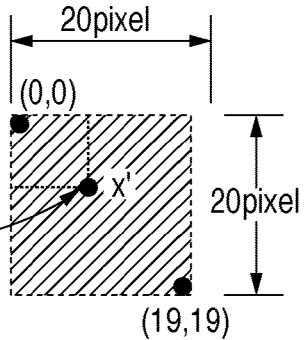
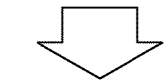
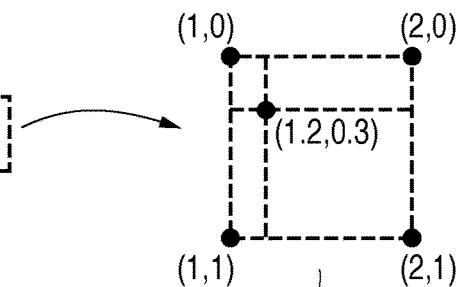
LOCAL REGION IMAGE OF SPECIFIC VARIATION n (BEFORE DEFORMATION)
NORMAL LOCAL REGION IMAGE (AFTER DEFORMATION)
CORRESPONDENCE POINTS BEFORE AND AFTER DEFORMATION
1000
CORRESPONDENCE POINT LIST
| COORDINATES x' AFTER DEFORMATION | COORDINATES x BEFORE DEFORMATION |
|---|---|
| (0,0) | (0,1.1) |
| (1,0) | (1.2,0.3) |
| (2,0) | (3.5,1.7) |
| (3,0) | (4.0,2.2) |
| ⋮ | ⋮ |
| (18,19) | (21.7,23.0) |
| (19,19) | (23.1,23.9) |
1001
1002

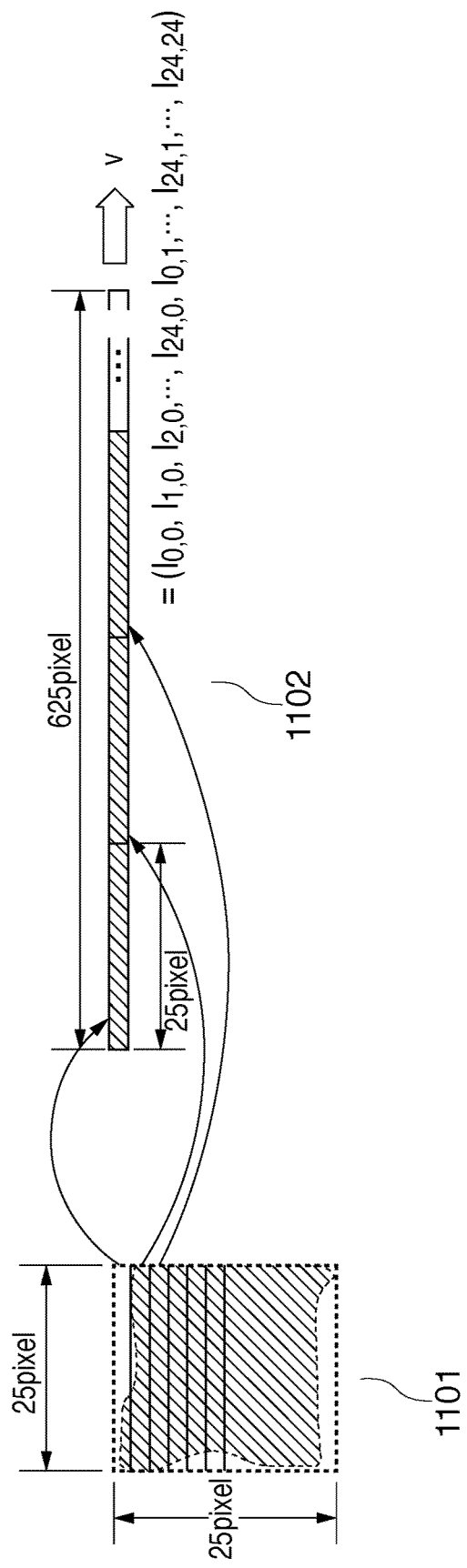

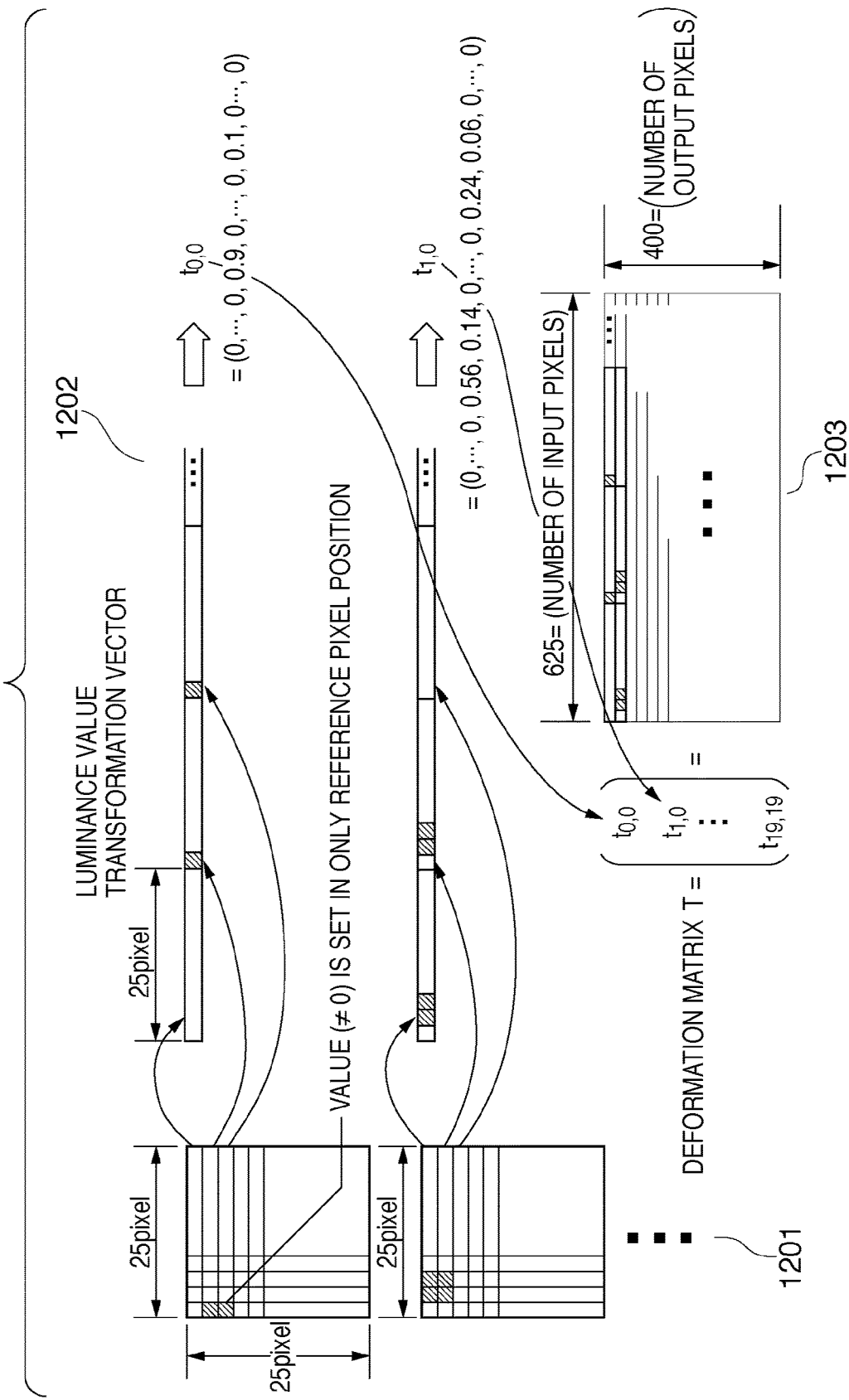

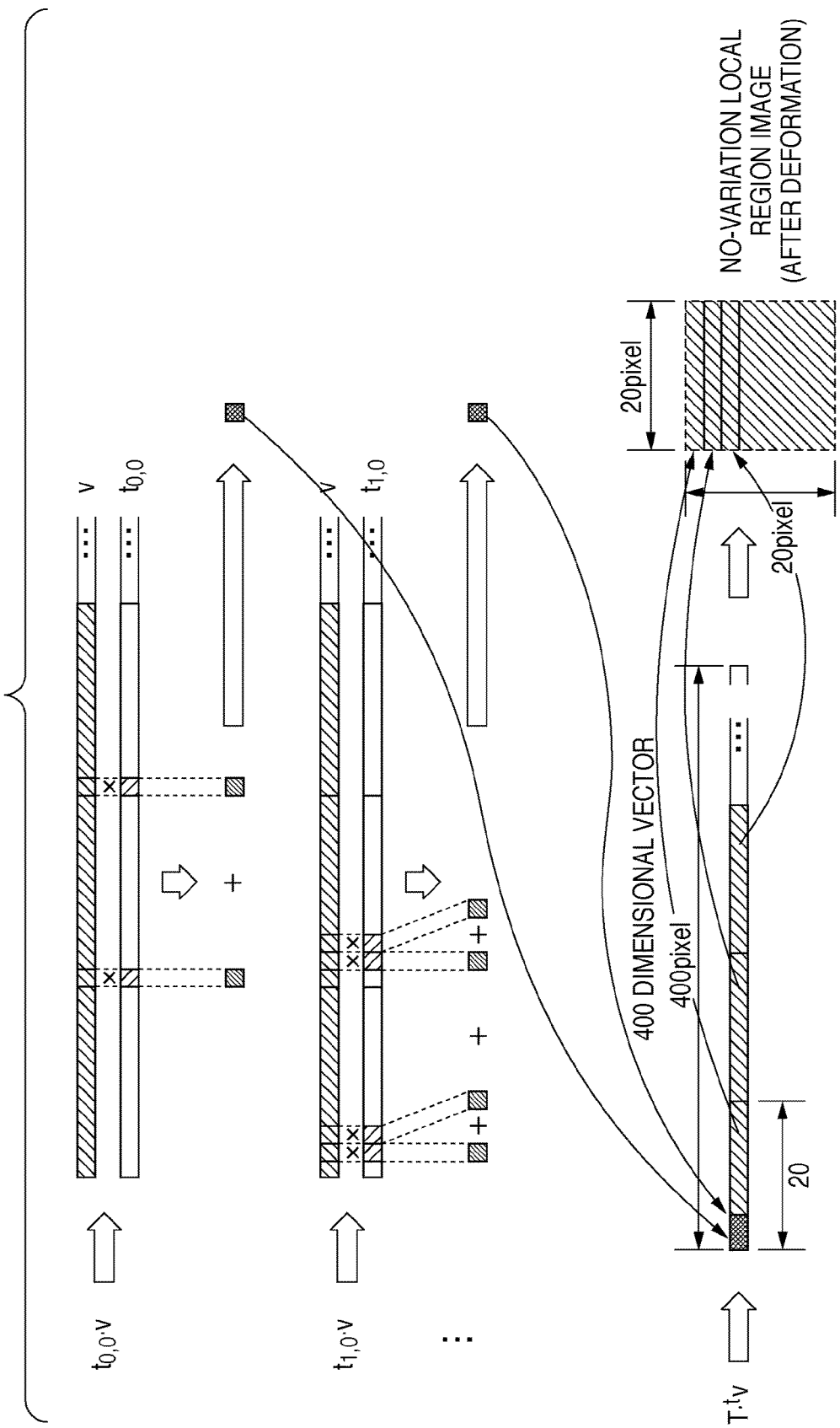

FIG. 13A

| 1 | 2 | 1 |
|---|---|---|
| 2 | 4 | 2 |
| 1 | 2 | 1 |

| -1 | -1 | -1 |
|---|---|---|
| -1 | -1 | -1 |
| -1 | -1 | -1 |

| -1 | -1 | -1 |
|---|---|---|
| -1 | -1 | -1 |
| -1 | -1 | -1 |

1602:

| 0 | 1 | 0 |
|---|---|---|
| 1 | -4 | 1 |
| 0 | 1 | 0 |

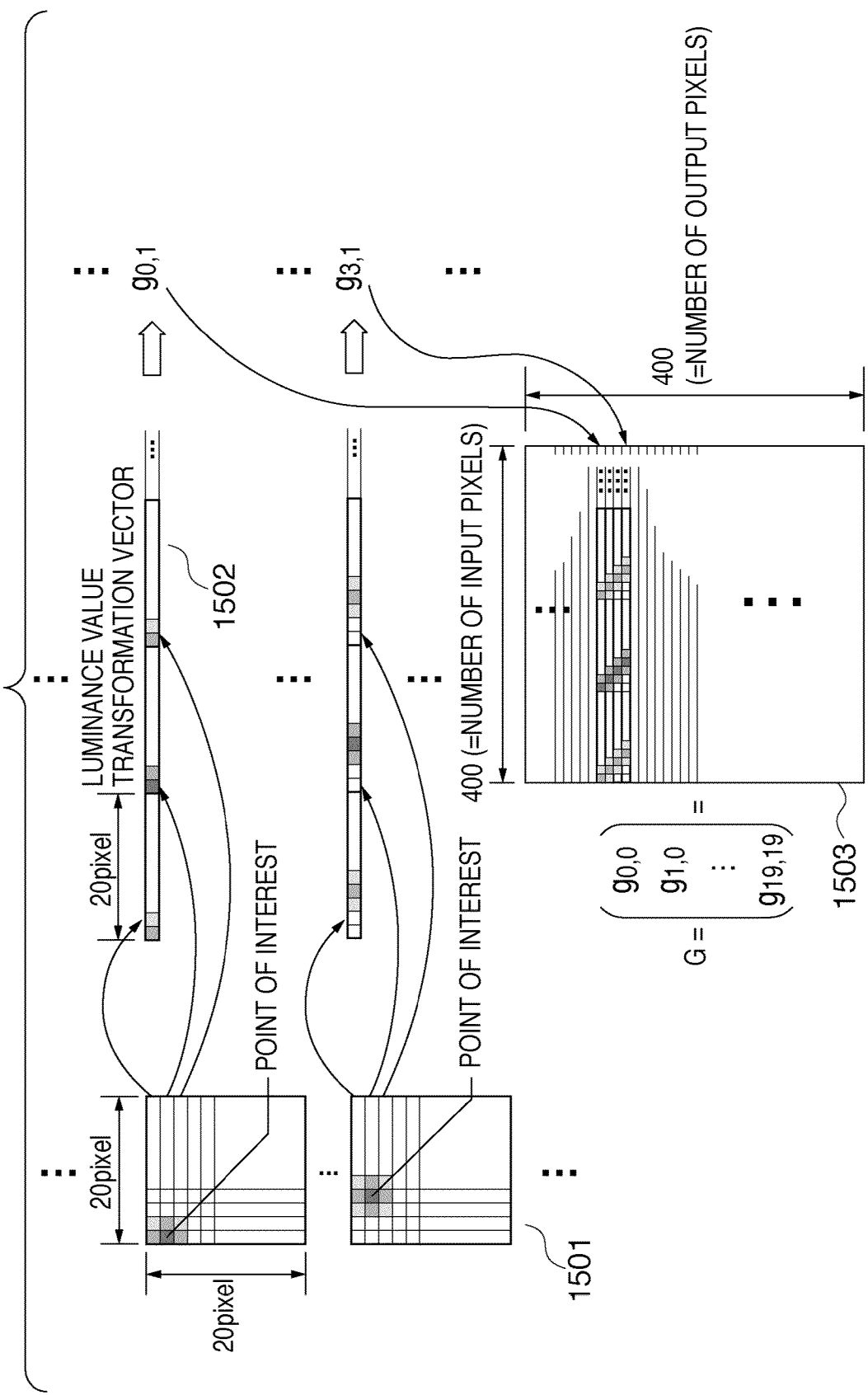

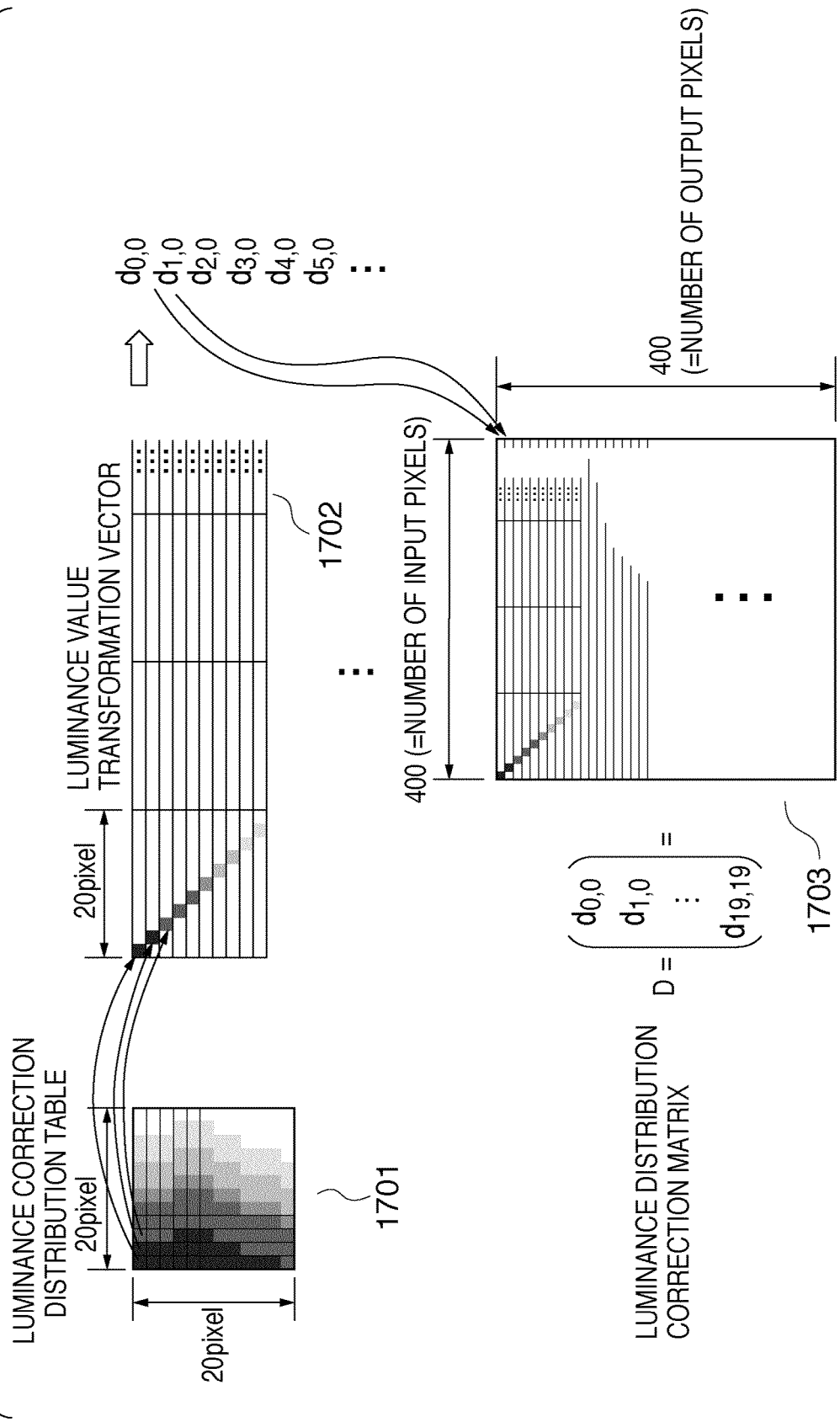

IMAGE OF VARIATION ATTRIBUTE 1

2203   2202 2201

NO-VARIATION IMAGE

2201

IMAGE PROCESSING APPARATUS AND METHOD, AND COMPUTER-READABLE STORAGE MEDIUM

BACKGROUND OF THE INVENTION

1. Field of the Invention

The present invention relates to an image processing apparatus and an image transformation processing method.

2. Description of the Related Art

Conventionally, identification technology for identifying people based on physical features such as fingerprints, palm prints, veins, and irises, so-called biometric authentication technology has been developed. Biometric authentication technology includes many processes that are performed using images acquired by a photoelectric conversion imaging apparatus, such as a digital camera, or data that has been converted to two-dimensional space data corresponding to an image. Face authentication technology using face images, among others, is one of the technologies that is attracting particular attention because face authentication technology involves the same actions as those usually performed by people when identifying other people, and there is less of a sense of resistance to face authentication technology than in other authentication technologies such as fingerprint authentication technology.

One of the problems that arises when identifying individuals using face images or the like is that variations due to other factors are larger than inter-individual variations. In other words, even if images are captured from the same person, the images may often be determined to be of different persons due to variations caused by lighting conditions, facial expressions, facial orientations, accessories such as glasses, cosmetics and so on, that is, the images may be determined to be similar to variation images of another person under the same conditions. For this reason, it can be said that it is very difficult to extract and classify only inter-individual differences while ignoring photographic conditions and other variations.

In order to cope with this problem, as a conventional technique, a method has been proposed that focuses on local regions in a face image. Even when variations as described above occur in the data of a plurality of face images obtained by capturing an individual, the influence does not always appear uniformly in the entire face region. For example, even when there are changes in facial expressions, there are few variations around the nose. If strong light is incident obliquely, the irradiated portion that is not in the shade exhibits few variations. Also, when the face turns to the left with respect to the viewer, because the face has a three-dimensional shape, the right side portion exhibits fewer variations than the left side portion. Accordingly, even when some local regions have large variations, it can be expected that the other local regions have only variations with which individual identification is possible. In other words, it is considered that good individual identification is possible by selectively integrating similarities of local regions that have relatively few variations.

However, the method that selectively uses local regions uses only a part of information appearing in an image, which is disadvantageous in terms of identification accuracy. Furthermore, variations do take place even in local regions that have relatively few variations, and thus the similarity is lowered when the conditions are different from those when registered images were taken.

As a method for resolving this problem and improving identification accuracy, "Learning Patch Correspondences for Improved Viewpoint Invariant Face Recognition", A. B. Ashraf, S. Lucey, T. Chen, Carnegie Mellon University, IEEE International Conference on Computer Vision and Pattern Recognition (CVPR), June 2008 (hereinafter referred to as Non-Patent Document 1) discloses a face recognition method in which each local region is individually affine-transformed according to facial orientation attributes, and thereafter similarity is calculated. For example, frontal images that have been normalized in advance are used as registered images, and images of a plurality of local regions that are rectangular regions provided at predetermined positions are held as registration data. If an input image to be identified is, for example, an image in which the face has been turned back to the left by approximately 30 degrees, each of extracted rhombic local regions is deformed into a frontal face orientation-equivalent rectangular shape through affine transformation, and thereafter similarity between the local region and a registered local region having the same rectangular shape is calculated. The similarity calculated here is the sum of differences between pixels at the same position.

In order to determine the rhombic shape of an extracted local region from the image in which the face has been turned back to the left by approximately 30 degrees, and deform it to a frontal face orientation-equivalent rectangular shape, different affine parameters are learnt in advance for each local region by using a large number of pair images. In Non-Patent Document 1, so-called Lucas-Kanade method (B. Lucasand T. Kanade, "An iterative image registration technique with an application to stereo vision", Proceedings of Imaging Understanding Workshop, page 121-130 (hereinafter referred to as Non-Patent Document 2)) is used to estimate affine parameters. This estimation can be performed online in units of pairs of an individual input image and a registered image, but it has been reported that identification accuracy is rather improved by using parameters that have been learnt in advance as average parameters by using a large number of sample pair images. This is presumably because the use of average parameters eliminates errors due to individual noise and the like. The use of parameters prepared in advance is of course advantageous in terms of processing speed compared to the case where estimation processing is performed online in units of pairs of an individual input image and a registered image.

Also, "Face Recognition based on Local Region Extraction according to Facial Orientation", Ijiri Yoshihisa, et al., Proceedings of 13th Symposium on Sensing via Image Information, Yokohama, June 2007 (hereinafter referred to as Non-Patent Document 3) discloses a face recognition method in which the position of a local region and the extraction size are set with reference to detected feature points. Extracted rectangular local regions are normalized to a normal size, and their similarity is calculated. The feature points serving as the reference points are points that can be detected relatively easily, such as the left end (outer corner) of the left eye. Then, the positions of local regions are determined by relative coordinates (a, b) in predetermined horizontal axis X direction and vertical axis y direction from the detected reference points. At this time, in order for the local regions to be always at substantially the same positions, it is effective to change the relative coordinate values according to the facial orientation. Furthermore, in order for extracted local regions to be within substantially the same face region, scale c may also be changed according to the facial orientation.

In Non-Patent Document 3, facial orientation estimation is performed using position information regarding a plurality of detected feature points, and parameters learnt in advance are selected according to the estimated facial orientation. In the case of the face facing the front, for example, regions are extracted using parameters $a_1$, $b_1$, and $c_1$, and in the case of the face turning to the left, the same regions are extracted using different parameters $a_2$, $b_2$, and $c_2$.

Japanese Patent Laid-Open No. 2007-34724 (hereinafter referred to as Patent Document 1) discloses a method in which an entire face image to be processed is morphed into a reference face image (average face) with the use of deformation vectors. The deformation vectors are calculated based on correspondence points between the image to be processed and the reference image, and are considered to be the same as the relative coordinates that represent a point in the reference image corresponding to a point in the image to be processed. The deformation of a face image in Patent Document 1 is performed for the purpose of generating a facial caricature.

As disclosed in Non-Patent Document 1, it has been proven that the deformation processing, in which each local region is deformed into a normal state as much as possible, performed prior to identification processing has certain effects in improving the identification ratio. For example, situations often arise in which one wants to perform deformation processing and spatial filter processing as pre-processing for image compression processing or the like, not only recognition processing. In such a case, the methods described above have the following problems.

According to the method disclosed in Non-Patent Document 1, the technique for deforming local regions is limited to affine transformation. With affine transformation, it is possible to correct orientation variations in a plane. However, because human faces have a complex shape, the errors created by treating local regions as planes are not small. Furthermore, in addition to the problem of orientation variations, this method has the problem in that it is not possible to correct physical shape deformations due to changes in facial expressions.

In addition, it is necessary to perform deformation processing prior to similarity calculation using registered images, which increases processing loads. The Lucas-Kanade method is originally a technique for finding a correspondence point between two images, and therefore it is possible to represent arbitrary deformations as a correspondence point list, for example, by extending the technique of this document, but in this case as well, problems of increased processing loads and increased parameters arise.

According to the method of Non-Patent Document 3, although scaling is performed in units of local regions, extraction is always performed in the shape of a rectangle, and the shape is not deformed, and therefore there is a limit to the improvement of similarity for each region. There are also concerns over the increase of processing loads due to the additional scaling processing.

The method for deforming a face image according to Patent Document 1 is deformation processing performed on an entire face image, but this method can be applied as pre-processing for face identification processing. It is also conceivable to perform deformation in units of local regions in the same manner. In this case, a deformation vector (or in other words, correspondence point) is attached to each representative feature point, and the pixels between representative feature points are deformed while being interpolated. In this case as well, the processing loads are not negligible. In addition, in order to flexibly cope with various kinds of deformations, it is necessary to increase the number of feature points to which deformation vectors are attached, and in this case, the increase of memory for storing parameters is the problem.

Also, a situation can arise in which one wants to perform as pre-processing for similarity calculation for each region, for example, not only deformation processing, but also filter processing such as blurring processing using a Gaussian filter or the like, and edge extraction processing. However, all of the above-described techniques require addition of filter processing, and thus are problematic in that the size and processing loads of the processing apparatus increase.

SUMMARY OF THE INVENTION

The present invention has been conceived in light of the above problems. A preferred embodiment of the invention provides a method and apparatus with which it is possible to perform various types of spatial transformation processing such as image deformation, linear spatial filter processing and luminance distribution correction processing, without increasing parameters and processing loads.

According to one aspect of the present invention, there is provided an image processing apparatus comprising: a holding unit configured to classify a variation of a target object included in an image from a specific state as one of a plurality of types of attributes, and to hold, for each variation attribute, a correction parameter for spatial transformation that corrects the target object to the specific state; a vectorizing unit configured to generate an input image vector by vectorizing at least a partial region of the input image; a determination unit configured to determine a variation attribute by detecting a variation of the target object from the specific state in the input image; and a generation unit configured to select a correction parameter from the holding unit based on the variation attribute determined by the determination unit and generate a transformed image vector by performing the spatial transformation on the input image vector, using the selected correction parameter.

Also, according to another aspect of the present invention, there is provided an image processing method performed by an image processing apparatus including a holding unit configured to classify a variation of a target object included in an image from a specific state as one of a plurality of types of attributes, and to hold, for each variation attribute, a correction parameter for spatial transformation that corrects the target object to the specific state, the method comprising the steps of: generating an input image vector by vectorizing at least a partial region of the input image; determining a variation attribute by detecting a variation of the target object from the specific state in the input image; and selecting a correction parameter from the holding unit based on the variation attribute determined in the determination step and generating a transformed image vector by performing the spatial transformation on the input image vector, using the selected correction parameter.

Further features of the present invention will become apparent from the following description of exemplary embodiments with reference to the attached drawings.

BRIEF DESCRIPTION OF THE DRAWINGS

FIG. 2 is a block diagram showing a configuration of a face image recognition processing apparatus.

FIG. 3 is a block diagram showing an example of a configuration of an ordinary feature vector calculation unit.

FIGS. 5A to 5E are schematic diagrams showing an example of processed face images, from the input face image to determination of positions of local regions.

FIG. 9 is a diagram illustrating a correspondence point list for local region deformation and a reference ratio from neighboring pixels.

FIG. 10 is a diagram showing vectorization of a local region image.

FIG. 11 is a diagram illustrating a mechanism of an example of a deformation matrix.

FIG. 12 is a diagram illustrating a deformation operation using an example of a deformation matrix.

FIGS. 13A and 13B are diagrams showing examples of linear spatial filters that are the basis of an all-pass filter processing matrix.

FIG. 14 is a diagram illustrating an example of an all-pass filter processing matrix.

FIG. 15 is a diagram illustrating a mechanism of an example of a luminance distribution correction matrix.

DESCRIPTION OF THE EMBODIMENTS

Figure 1A:
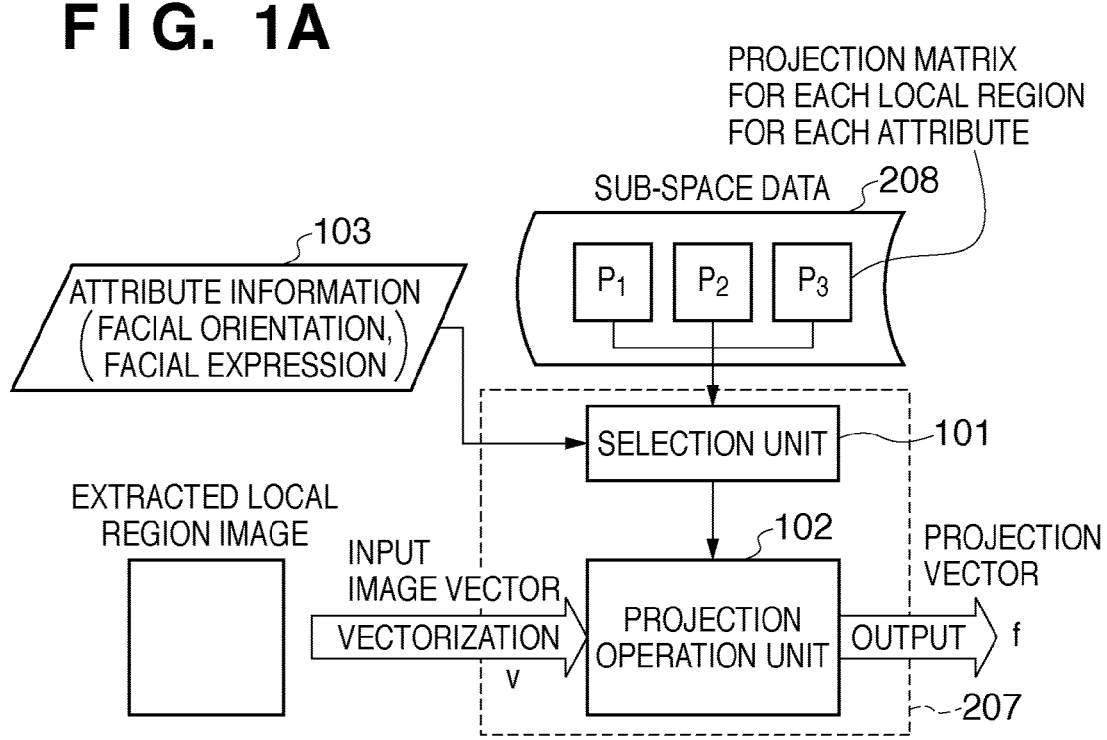
FIG. 1A is a diagram illustrating operations of a feature vector calculation unit and a projection matrix storing unit.

Hereinafter, embodiments for carrying out the invention will be described with reference to the drawings. In embodiments given below, in particular, an image spatial transformation processing method for correcting a variation of a local region of an image corresponding to a specific variation attribute and application of spatial transformation processing to an image identification processing method for identifying an image based on similarity between local regions will be described.

Embodiment 1

Description of Overall Block Diagram

FIG. 2 is a block diagram showing a configuration of a face image recognition processing apparatus to which an embodiment of an image processing apparatus of the present invention is applied. Each block is implemented as, for example, a dedicated hardware processing circuit, and is connected with a predetermined I/F. Although not shown, there is a control unit that performs overall control of constituent units and causes the units to execute a series of processes for registration or identification.

An image input unit 201 receives an input of a face image extracted in a predetermined size by pre-processing (not shown). The image from which the face image is extracted is, for example, electronic data acquired by a camera apparatus. Such a camera apparatus is constituted by, for example, an optical system, a photoelectric conversion device such as a CCD (charge coupled device) sensor, a driver circuit, an AD converter, a signal processing circuit that controls various types of image correction, a frame buffer, and so on.

A feature point detection unit 202 detects accurate location coordinates of feature points in the input image input by the image input unit 201. As used herein, "feature points" refer to constituent parts of the face, such as the eyes and the mouth, and their end points (the outer corners of the eyes, the inner corners of the eyes, the nostrils and the like). This detection processing is performed using a pattern detection technique such as template matching. It is also possible to use the same pattern detection technique as the face detection processing of the pre-processing. In addition, in order to increase the detection accuracy, it is also possible to use geometric constraints (e.g., the symmetry in the horizontal direction, the vertical relationship between face parts, and the like) in the human face.

A normalizing unit 203 transforms (normalizes) the input image by using the detection result by the feature point detection unit 202 such that a predetermined feature point (e.g., eyes) is located in the normal position, and also transforms each of the feature point coordinates to represent coordinates in the normalized image. The input image and the feature point coordinates are transformed based on an affine transformation. Affine parameters used here can be determined based on, for example, if the eyes are used as a reference, rotation angle, length scaling factor, center-point movement direction and distance with respect to two line segments: a line segment connecting the eyes in the image before transformation and a line segment connecting the eyes in the normal position. In the transformation of the input image, each point in the normalized image into which the input image is transformed is determined by an inverse affine transformation of the respective original coordinate positions in the input image. The coordinate position usually has a real value with digits after the decimal point, and thus a luminance value is calculated by performing interpolation according to the distance from surrounding pixels. The transformation of feature point coordinates is the affine transformation itself. The normalizing unit 203 transmits an image that has been normalized (normalized image) to a local region extraction unit 204 and an attribute determination unit 205.

The local region extraction unit 204 performs processing for setting and extracting a plurality of local regions from the normalized image based on a plurality of local region definitions stored in a local region definition storing unit 206 and the feature point coordinates normalized by the normalizing unit 203. These local regions may be in fixed positions in the normalized image, but in the present embodiment, the positions are determined based on a plurality of feature point coordinates. For example, a calculation method is defined such that a position located away from the center point of a line connecting two feature points in the direction of the mouth by a predetermined amount is used as the base point of a rectangle. A combination thereof with rectangular size information is referred to as a "local region definition", which is stored in the local region definition storing unit 206 in the present embodiment.

In the present embodiment, the rectangle size of the regions is fixed, but it is of course possible for the rectangle size to be variable based on the feature point position. In this case, scaling processing is further required to transform each extracted region into a normal size. If corresponding scaling factors are limited to several discrete values, the scaling processing can be implemented using a deformation matrix, which will be described later. Also, if one wants to extract regions in a shape other than a rectangle, it can be achieved by masking a rectangular region and extracting only pixels constituting the desired shape.

The image from which the local region extraction unit 204 extracts regions may be a normalized luminance image, but the present invention is not limited thereto. There are cases where better identification results can be obtained by using, for example, an image that has undergone lighting variation correction, an encoded image subjected to so-called incremental encoding or a local binary pattern (LBP), an edge extraction image, or the like. In the case of using such an encoded image, edge extraction image or the like, implementation is possible by adding a desired transformation filter processing unit between the normalizing unit 203 and the local region extraction unit 204.

The attribute determination unit 205 determines an attribute by using the normalized feature point coordinates and normalized face image that is output from the normalizing unit 203. As used herein, "attribute" is a classification of a variation, from a specific state, of the target object in the input image. In the case of the target object being, for example, "face", it refers to a variation factor that causes the two-dimensional image shape of the appearance of the face to be changed (a variation from the face seen from the front), such as orientations in the depth direction of the face (angles in the vertical and horizontal directions) and facial expressions (a smiling face, closed eyes, no facial expression, and so on). The present embodiment will be described taking mainly a facial orientation attribute as an example, but also other variation factors can be handled in the same manner. The attribute determination unit 205 is configured of a classifier of existing technology such as a support vector machine (SVM), a neural network or a linear discriminant analysis (LDA) that has learnt in advance a large number of sample face images having known attributes. The attribute determination may be performed using both the normalized feature point coordinates and the normalized face image depending on the variation attribute to be determined, but it is also of course possible to perform the attribute determination by using either one according to various conditions such as a trade-off between required performance and speed.

A feature vector calculation unit 207 receives an input of each local region image extracted by the local region extraction unit 204, lines up the pixels in a predetermined order for each region, and performs vectorization. Then, the feature vector calculation unit 207 calculates a feature vector by performing a projection operation through a matrix multiplication with the input vector, using a projection matrix for each region held in a projection matrix storing unit 208.

A projection matrix is usually a dimensionally reduced projection matrix that projects an input vector onto a lower dimensional sub-space, and that has been learnt in advance from a large number of samples by using a technique such as principle component analysis (PCA) or independent component analysis (ICA). Each local feature vector is thereby transformed to a vector of lower dimension, and therefore it is possible to reduce the storage capacity for registration data as well as the load of the subsequent similarity calculation. It is generally known that dimensional reduction of feature vectors not only enables reducing the amount of data and the amount of calculation, but also improves the identification ratio. This is presumably because information that is irrelevant to the identification, such as noise and variations in the photographic environment can be reduced.

Accordingly, it is desired that the sub-space represented by each projection matrix is ideally such a space that leaves only an inter-individual variation and eliminates intra-individual variations, or in other words, variations due to variations in lighting, orientation, facial expression, and the like. Although there is a possibility that such a sub-space that is close to the ideal sub-space can be determined by principle component analysis (PCA), it is not known in this case which of the extracted principle components (eigenvectors) best represents the inter-individual variation. Accordingly, it is also possible to employ a configuration in which a test is performed using a large number of sample data with known correct answers after all principle components have been extracted, and only principle components with which good individual identification is possible are selected. Alternatively, in the case of using independent component analysis (ICA), if it can be assumed that intra-individual variation follows a Gaussian distribution, it may also be possible to directly calculate a sub-space representing an inter-individual variation. Alternatively, it is also possible to use a method of applying a linear discriminant analysis (LDA) technique, and finding a sub-space that maximizes an out-of-class variation (inter-individual variation in this example) and minimizes an in-class variation (intra-individual variation in this example).

In any of these techniques, it is necessary to prepare in advance a large number of sample data and determine a projection matrix through analysis and learning. The analysis and learning processing do not necessarily need to be performed within the face image recognition processing apparatus, and it is only necessary to perform calculation in advance using a high-specification computer, and store the determined projection matrices in the projection matrix storing unit 208 provided in the face image recognition processing apparatus.

In the present embodiment, the feature vector calculation unit 207 selects a corresponding projection matrix from the projection matrix storing unit 208 using the attribute information determined by the attribute determination unit 205. In other words, there is not one projection matrix held for each local region, and a number of projection matrices corresponding to the number of types of attributes to be determined is stored. The projection matrices and the feature vector calculation unit 207 will be described later in detail.

A registered feature vector storing unit 210 holds the feature vectors of all local regions of each registered face image. When registering an input face image, the face image recognition processing apparatus is driven in a registration mode. In the registration mode, the feature vector of each local region calculated by the feature vector calculation unit 207 is held in the registered feature vector storing unit 210 together with an individual ID of the face image, and the process ends.

The individual ID is input together with a face image to be registered during the registration mode via a user I/F or communication I/F unit (not shown). When registering a plurality of face images using the same individual ID, image IDs may be assigned in the order of registration and stored together with the face images. Of course, it is also possible to store the attribute information determined by the attribute determination unit 205 as well.

A similarity calculation unit 209 performs processing during an identification mode. The similarity calculation unit 209 calculates similarities between the feature vector of each local region that is output from the feature vector calculation unit 207 and the registered feature vectors of the same region with respect to all IDs held in the registered feature vector storing unit 210. Here, for each of the IDs, a similarity is calculated with respect to all local regions of the input image. As the similarity, the distance (the norm of a differential vector), angle or the like between a feature vector and a registered feature vector can be used. The similarity will be described later in detail.

A result integration unit 211 performs processing for integrating the similarities of all regions for each individual identification (ID). The simplest way is to add or average the similarities of all regions so as to obtain similarity for that ID. Alternatively, the regions may be temporarily sorted in descending order of similarity, and a predetermined number of regions from the top may be averaged, such that regions with low similarity are not integrated, as a result of which a good similarity may be obtained. It is also of course possible to weight and add the regions in the order considered to be important.

A final determination unit 212 references the obtained similarity for each ID, and takes the ID having the highest similarity as the identification result for the input image. Alternatively, it is also possible to sort IDs in descending order of similarity, and take the ID having the highest frequency of appearance down to a predetermined rank as an identification result. If none of the similarities of all IDs exceeds a predetermined threshold value, the final determination unit 212 determines that the input image is none of the registrants.

If feature vectors based on a plurality of registered images have been registered with respect to a given individual ID, for example, the average or maximum value of the integrated similarities of all image IDs that are registered is taken as the integrated similarity of that individual ID. If attribute information has been stored together in the registered feature vector storing unit 210, a registered feature vector may be used selectively based on the result of attribute determination.

Registration Procedure

The procedures performed during the registration mode and the identification mode according to the present embodiment will be described next with reference to FIGS. 5A to 5E and FIGS. 17 and 18. Registration processing is processing for extracting feature amounts from an input image and storing the feature amounts in a storage unit together with an individual identification (ID) simultaneously input as registration data. Identification processing is processing for extracting feature amounts from an input face image, comparing the feature amounts with registered feature amounts, and identifying whose face the face image is. These procedures are executed by a control unit (not shown) sequentially controlling the blocks shown in FIG. 2.

Here, face images that are input to the face image recognition processing apparatus according to the present embodiment are assumed to be images having a predetermined size in which the face size is substantially uniform, and the in-plane rotation angle is substantially close to 0 degrees (erect). FIG. 5A shows an example of an input face image. When the face image recognition processing apparatus of the present embodiment is applied to, for example, a digital camera or a portable terminal equipped with a camera, one conceivable example is an application that performs processing on images that are captured when the face has appeared at the normal size within a predetermined frame of the viewfinder or monitor.

Alternatively, when it is necessary to perform processing on images, such as snapshots, in which it is not known where in the image the face is included, face detection processing may be performed as pre-processing. Specifically, with face detection processing, the position, size, and in-plane rotation angle of the face in an image are determined to some extent, and a face image that has been normalized and extracted based on the determined information may be input to the face image recognition processing apparatus of the present embodiment. The face detection processing can be implemented by an apparatus configured using, for example, techniques disclosed in Japanese Patent Laid-Open No. 2002-358500 (hereinafter referred to as Patent Document 2), and P. Viola, M. Jones, "Rapid Object Detection Using a Boosted Cascade of Simple Features", Proc. IEEE Conf. on Computer Vision and Pattern Recognition, Vol. 1, pp. 511-518, December 2001 (hereinafter referred to as Non-Patent Document 4).

Figure 17:
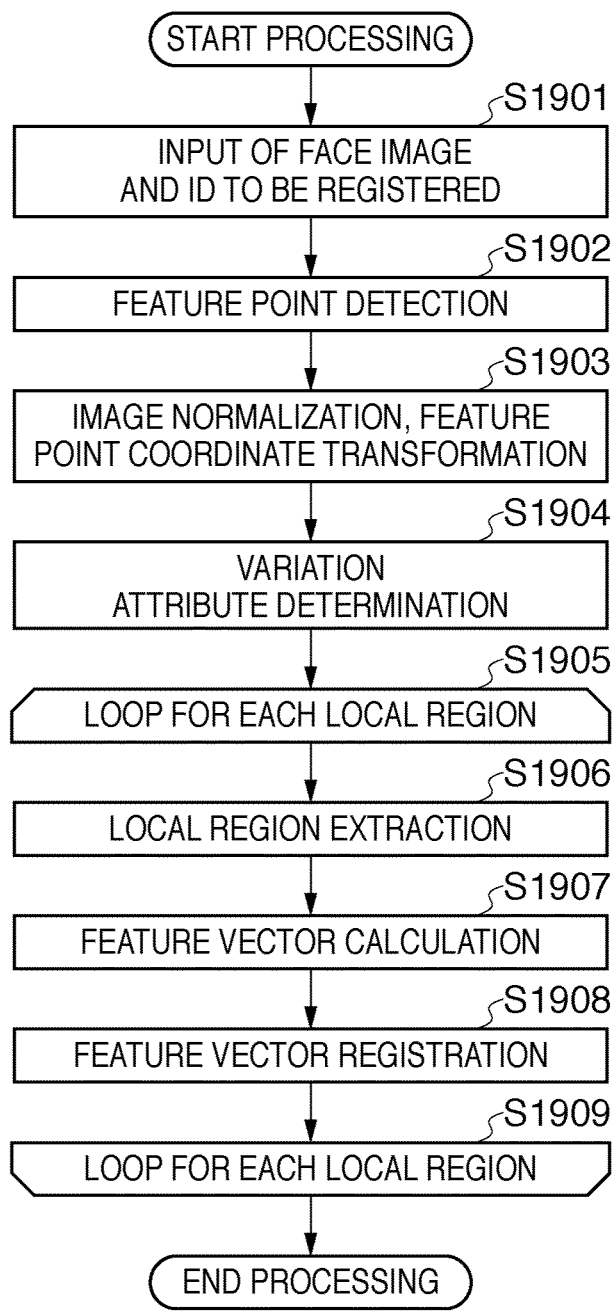
FIG. 17 is a flowchart illustrating processing performed during a registration processing operation mode.

In the registration processing shown in FIG. 17, firstly, in Step S1901, the image input unit 201 receives an input of a face image to be registered and an ID (or name or the like) for identifying the individual. Next, in Step S1902, the feature point detection unit 202 performs processing for detecting feature points in the input face image. As used herein, "feature points" refer to the center, upper, lower, right and left end points of face parts such as the eyes, the nose and the mouth. FIG. 5B shows a face image in which feature points have been detected, and in this example, nine points including the center, upper, lower, right and left end points of the eyes and the mouth have been detected. The processing performed here is pattern matching processing, but it is also possible to use existing template matching, or pattern detection techniques similar to face detection processing, as disclosed in Patent Document 2 and Non-Patent Document 4. This processing is performed on images having a size and an in-plane angle that are uniform to some extent, and thus the search region in an image can be made relatively narrow. However, inter-individual changes and shape changes due to facial expressions and rotation in the depthwise orientation are relatively large, and therefore highly robust pattern detection processing is required. The center point of the eyes and the mouth may be obtained by calculating the center point between two end points, rather than being directly detected.

Subsequently, in Step S1903, the normalizing unit 203 performs image normalization processing and feature point coordinate transformation based on the extracted eye positions. Here, a case is considered where affine transformation is performed such that the detected eyes come into a predetermined position. A line segment connecting the coordinates of the detected eyes is defined as line segment A, and a line segment connecting predetermined positions of the eyes (usually, opposite positions in the horizontal, left-right direction) is defined as line segment B. Then, six affine parameters can be determined using the angle between the line segment A and the line segment B as a rotation angle, the vector connecting the center point of the line segment A and the center point of the line segment B as a direction of movement, and the ratio of the length of the line segment B to the length of the line segment A as a magnification ratio. The feature point coordinate transformation can be performed by affine transformation using these parameters. In the image normalization processing, it is necessary to determine the luminance value of each transformed point. Accordingly, the same parameters are inverse affine-transformed to obtain coordinates (usually, real values) of untransformed correspondence points at each transformed pixel position, interpolation processing such as bilinear or bicubic interpolation is performed using neighboring pixels, and thereby all pixel values are determined. FIG. 5C shows a face image that has been normalized based on the eye positions, and FIG. 5D shows the normalized face image in which other feature points that have been coordinate transformed are displayed.

In Step S1904, the attribute determination unit 205 extracts face image attributes that have an influence on variations such as the shape and luminance distribution. As used herein, "attributes" can include, for example, orientations in the upper, lower, right and left directions of the face (rotation in the depth direction), and facial expressions such as a smiling face and closed eyes. Other possible examples include the type of light source, direction estimation, photographing location (indoor, outdoor), the original resolution (the distance to the subject, the degree of blurring), and so on. The present embodiment focuses particularly on horizontal rotation in the depth direction, but the same basic idea can be applied to other attributes.

This attribute determination by the attribute determination unit 205 is performed using a normalized image and feature point coordinates. Usually, the attribute determination unit has learnt in advance a large number of sample images having known attributes. For example, the determination unit is trained to learn feature amounts such as feature point coordinates and image luminance gradient histogram (histogram of gradient, HOG) features of images by labeling each facial orientation class. As the determination unit, a support vector machine (SVM), a neural network, or a technique such as a linear discriminant analysis (LDA) can be used.

The processing from Step S1905 to S1909 is loop processing performed for each local region. In the face image recognition apparatus of the present embodiment, the local region definition storing unit 206 has stored approximately several dozens of local region definitions. The local region definitions of the present embodiment are defined such that the position of a local region is calculated based on a plurality of feature points in each face, and the size is set to a predetermined size. The local region definitions include a number of normal state local region definitions and their corresponding specific variation local region definitions corresponding to the number of types of variation attributes determined in Step S1904. The normal state local region definitions are obtained by selecting in advance regions suitable to identify individuals from a face image sample data set in the normal state without variations through learning or the like. The specific variation local region definitions corresponding to the normal state local region definitions define, as will be described later, the method for calculating the position of a circumscribed rectangle of a region that will be a normal state local region if deformed according to the attribute, and the size of the circumscribed rectangle. They can be defined by adding a correction amount to the normal state local region.

FIG. 5E shows an example of an image obtained when the positions of local regions in the face image have been determined based on the local region definitions. In actuality, a position is determined for each region, the region is extracted, and the following processing is performed. Consecutive index numbers are assigned to the region definitions, and processing is executed in ascending order of the index number of the regions.

In Step S1906, the local region extraction unit 204 performs processing for extracting local region images. The local region extraction unit 204 selects a local region definition (there may be no variations) that corresponds to the attribute determined in Step S1904, determines a starting point (upper left) of a local region based on the feature point position normalized in Step S1903, and extracts the image region having a predetermined rectangular size. The extracted images are lined up in the order of the luminance value, and vectorized into input vectors. In the present embodiment, a luminance image is used as the image from which regions are extracted, but it is also possible to use an image that has been transformed to any type of feature amount, and in this case, the image is transformed by desired transformation filter processing before entering the loop starting from Step S1905.

In the next Step S1907, the feature vector calculation unit 207 calculates a feature vector by performing a projection operation on each input vector extracted in Step S1906. The feature vector is a vector obtained by projecting the input vector onto a sub-space using a projection matrix and reduced to approximately 10 to 20 dimensions. By projecting the feature vector and performing dimensional reduction, it is possible to remove unnecessary feature information that does not represent inter-individual differences, reduce the loads on the calculation of similarity with registered feature vectors, and reduce the capacity for registration data. As the projection matrix for each local region used here, a projection matrix corresponding to the attribute determined in Step S1904 is selected. The calculation of feature vectors will be described later in detail.

In Step S1908, the feature vector calculation unit 207 stores the created feature vector in the registered feature vector storing unit 210 together with the individual ID input in Step S1901. If a feature vector of the same region having the same individual ID has already been registered in the registered feature vector storing unit 210, an image index is added, and the feature vector is stored. In other words, in the face recognition processing apparatus of the present embodiment, a plurality of face images can be stored for one person as registration data. If the number of registered images exceeds a predetermined value, the following processing can be performed as appropriate. For example, already registered feature vectors may be compared in units of a combination of two sets of images, and the one of the sets having the smallest difference is deleted, and a new image is registered.

When the processing of one local region ends in Step S1909, the procedure returns to Step S1905. The registration processing ends when feature vectors of all local regions in the input image have been stored.

Identification Procedure

Subsequently, identification processing according to the present embodiment will be described with reference to FIG. 18. In Step S2001, the image input unit 201 receives an input of a face image of a predetermined size to be identified. Unlike Step S1901 of the registration processing of FIG. 17, the identification ID is not known at this time, and thus is not input. Processing from the feature point detection in Step S2002 to the variation attribute determination in Step S2004 is the same as that of the registration processing shown in Steps S1902 to S1904 of FIG. 17, and thus a detailed description thereof is omitted here.

Loop processing for each local region starting from Step S2005 to Step S2009 is also the same as that of the registration processing shown in Steps S1905 to S1909, except for Step S2008. Step S2008 is processing for temporarily storing the feature vector of a local region calculated by the feature vector calculation unit 207 in Step S2007. The feature vector stored here is used for the calculation of similarity with registered feature vectors.

Processing from Step S2010 to Step S2015 is a loop performed for each registered individual ID. If a plurality of images have been registered for one individual ID, this processing becomes a loop performed for each registered image number. That is to say, this loop is processing performed for each registered image (registered feature vectors of all local regions).

Processing from Step S2011 to Step S2013 is loop processing for each local region. In this loop, in Step S2012, the similarity calculation unit 209 calculates similarity with the registered feature vectors for each region. The feature vector with which similarity is calculated is the feature vector temporarily stored in Step S2008.

Figure 1B:
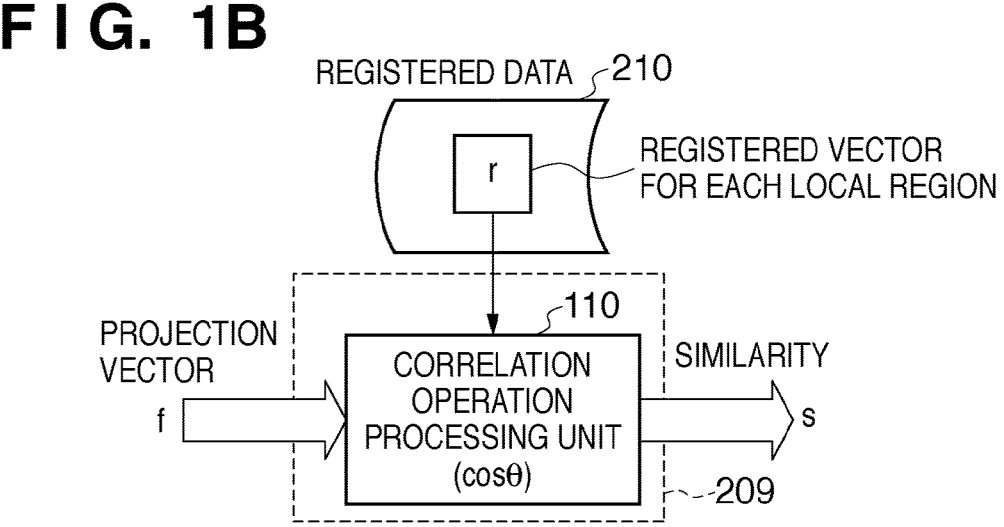
FIG. 1B is a diagram illustrating operations of a similarity calculation unit and a registered feature vector storing unit.
Figure 1C:
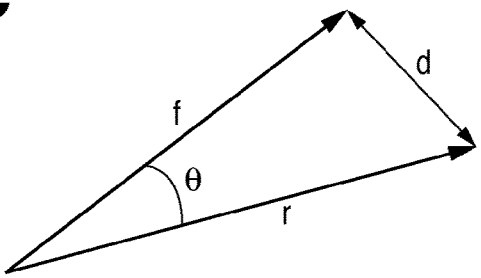
FIG. 1C is a diagram illustrating an example of similarity.

FIG. 1C is a diagram illustrating an example of similarity. If it is assumed that a registered feature vector is r, and a feature vector extracted from the input image is f, similarity can be calculated as, for example, a value based on a distance d between the two vectors. The smaller the value of the distance d is, the more similar are the two vectors, and therefore similarity $S_d$ can be defined by, for example, $$S_d = \frac{k}{k+d^2} = \frac{k}{k+(r-f)^2},$$

where k is a predetermined coefficient. With the definition like this, the similarity $S_d$ takes on a value ranging from 0 to 1.0. The closer to 1.0 the value is, the more similar are the vectors. As the distance, it is also possible to use other criteria such as the total of differences of vector element values (Manhattan distance, L1 norm) or Mahalanobis distance based on a probability distribution.

It is also possible to define similarity based on an angle θ between vectors r and f. In this case, similarity $S_\theta$ is defined by $$S_\theta = \cos\theta = \frac{r}{|r|} \cdot \frac{f}{|f|} = \frac{r \cdot f}{\sqrt{r^2}\sqrt{f^2}}$$

by using the cosine, for example.

The similarity $S_\theta$ takes on a value from −1.0 to 1.0, and the closer to 1.0 the value is, the more similar are the vectors. Alternatively, it is also possible to, with respect to each of the vectors r and f, generate a vector by subtracting the average value of vector element values from an element value to obtain an angle, and use the angle (normalized correlation). It is of course possible to combine these similarities, or use a similarity based on another measurement.

When similarities of all local regions have been calculated for one registered ID (registered image), next, in Step S2014, the result integration unit 211 performs processing for integrating these similarities. The most basic similarity integration processing is to calculate the average value (or total value) of the similarity values of all local regions. It is also possible to weight or selectively use the similarity of each region, and this may be changed according to the attribute. Similarity obtained through integration performed here is referred to as "integrated similarity".

If a plurality of images have been registered for one individual ID, processing for further integrating the integrated similarities of the images is performed here. In this integration processing, the greatest integrated similarity is selected from among a plurality of integrated similarities, or the plurality of integrated similarities are averaged so as to uniquely determine integrated similarity for the registered individual ID. Instead of performing the integration processing for each individual ID, integrated similarity may be managed in units of individual ID+image ID, and used to make the final determination.

If integrated similarity has been calculated for each registered individual ID in the above-described processing up to Step S2015, then, in Step S2016, the final determination unit 212 performs final determination processing. In this final determination processing, the integrated similarities are sorted in descending order of similarity, and the individual ID corresponding to the greatest integrated similarity is obtained as a determination result. If the greatest integrated similarity does not exceed a predetermined threshold value, it is determined that there is no appropriate registrant. Alternatively, if the integrated similarity integration processing for each individual ID was not performed in Step S2014, the individual ID serving as a final determination result may be determined, from among sorted integrated similarities, by considering the frequency of appearance of the individual ID within a range equal to or greater than a threshold value. The determined individual ID is notified to a predetermined output destination such as the user or an external apparatus in Step S2017, and the identification processing ends.

Detailed Description of Feature Vector Calculation Unit 207

FIG. 1A is a diagram illustrating the operations of the feature vector calculation unit 207 and the projection matrix storing unit 208 described in connection to FIG. 2. FIG. 1B is a diagram illustrating the operations of the similarity calculation unit 209 and the registered feature vector storing unit 210.

In the feature vector calculation unit 207, firstly, with respect to each extracted local region image, all pixels are lined up in a predetermined order and vectorized. Vectorization is executed in the following procedure as shown in FIG. 10 as an example. The pixel located at the upper left in the extracted local region is set as the start pixel, pixel values are sequentially arranged in the right direction one pixel after another, then, when the right end is reached, it wraps around to the left end pixel of the next row, and pixel values are arranged in the same manner. An input image vector generated in this manner is represented by v. In FIG. 10, $I_{x,y}$ represents the luminance values at the pixel coordinates with the pixel located at the upper left of the local region as the origin.

In the projection matrix storing unit 208, projection matrices are held for each variation attribute, such as a facial orientation or a facial expression, that can be determined by the attribute determination unit 205. Specifically, the projection matrix storing unit 208 classifies a variation of the target object (face) in the image from a specific state as one of a plurality of types of attributes, and holds a correction parameter for spatial transformation processing that corrects the target object to the specific state for each variation attribute. Here, three types (1 to 3) of attributes that can be determined by the attribute determination unit 205 are used, and projection matrices as correction parameters corresponding to respective attributes are represented by $P_1$ to $P_3$. It should be noted that $P_1$ to $P_3$ include different sets for each local region. Although the method for generating projection matrices corresponding to the respective attributes will be described later, a configuration is employed in which even, when one of the attributes is selected, if the local regions are the same, the projection is into the same sub-space so that vectors can be compared with each other.

In the feature vector calculation unit 207, a selection unit 101 selects a corresponding projection matrix based on attribute information 103 that has been input from the attribute determination unit 205. Then, a projection operation unit 102 calculates a projection vector f through matrix operation with an input image vector v with the use of the selected projection matrix. In other words, $f = P_n^t v$ (n is the attribute number). Then, during the registration mode, a registered feature vector r of each local region is obtained as f=r and stored in the registered feature vector storing unit 210 together with the individual ID. During the identification mode, a similarity s between the projection vector f and the registered feature vector r of the same local region of each registered individual ID is calculated by a correlation operation processing unit 110 of the similarity calculation unit 209. The present embodiment employs similarity $S_\theta$ (cos θ). That is to say, the similarity s of FIG. 1B is obtained by $$s = S_\theta = \cos\theta = \frac{f \cdot r}{|f||r|} = \frac{f \cdot r}{\sqrt{f^2}\sqrt{r^2}}.$$

Here, if |r| is calculated in advance during the registration processing, and $(r/\sqrt{r^2})$ is stored as a registered feature vector instead of r, it is possible to reduce the calculation load during the identification processing.

FIG. 3 shows an example of an ordinary feature vector calculation unit 207. In this example, the configuration in which the projection matrix is changed according to the attribute is not introduced, and the projection vector f is calculated using a single average projection matrix P for each region in the case of any variation attribute. As described previously, with the projection matrix P, sub-space can be learnt in advance, for example, by using a technique such as principle component analysis (PCA). In the case of the conventional technique, face images with various desired variation attributes are prepared in advance as learning data, and the average sub-space common to all attributes is calculated using the face images. For this reason, the extracted sub-space does not always well represent inter-individual features, and it is often the case that variation attributes such as an orientation and a facial expression are easily distinguished, which significantly contributes to the deterioration in identification performance.

In order to avoid this, for example, when different sub-spaces are learnt for respective attributes by independently using per-attribute sample data, even if the projection dimensionality is the same, different spaces are obtained. Accordingly, even when the projection vectors are in the same local region, if the attributes are different, they are projected to a space in which comparison is not possible. In other words, with the conventional technique, it is not possible to generate projection matrices $P_1$ to $P_3$ configured such that the projection is into the same sub-space.

In contrast, in the face recognition processing apparatus of the present embodiment, in order to address this problem, a technique is proposed in which the spatial transformation of, for example, the shape of local regions and the learning of sub-spaces for identification are separated. When learning a sub-space for identifying an individual through principle component analysis or the like, a normal state projection matrix $P_s$ is learnt using a face image in the normal state without variations as learning data. Then, separately from this, per-attribute spatial transformation matrices for transforming local regions into normal state local regions for each corresponding variation attribute are learnt using pairs of images including a variation attribute image and a normal state image. And, the per-attribute spatial transformation matrices and the normal state projection matrix are synthesized to generate projection matrices corresponding to the variation attributes. In other words, the feature vector calculation unit 207 generates a transformed image vector by performing spatial transformation processing for correcting the target object (the face in this example) to a specific state (normal state) on the input image vector based on the attribute determined by the attribute determination unit 205. The transformed image vector is then subjected to projection operation processing for projecting the transformed image vector to a predetermined sub-space of lower dimension to generate a projection vector.

Deformation Matrix as Spatial Transformation Matrix

Figure 4A:
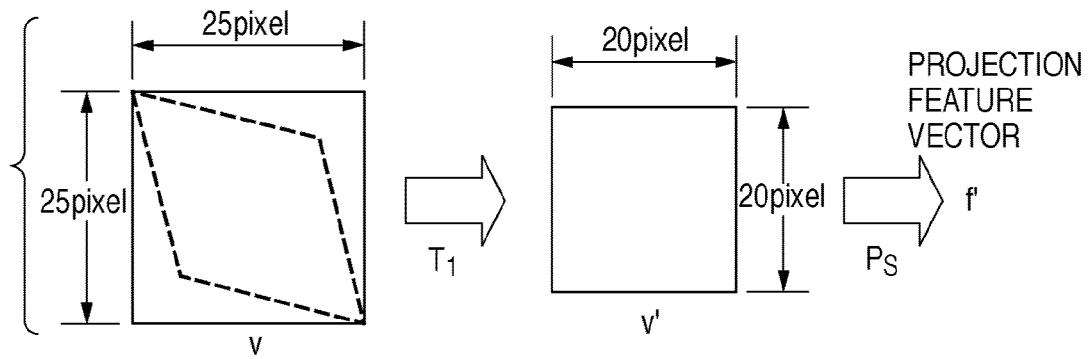
FIGS. 4A to 4D are diagrams illustrating deformation processing and projection processing according to an embodiment of the present invention.

Here, a method for deforming per-variation attribute local regions will be described as an example of spatial transformation processing. It should be noted that although the input image vector is transformed into a transformed image vector through spatial transformation processing, the transformed image vector in the present embodiment is a normal state vector, which will be described later. FIG. 4A is a diagram illustrating an example in which a deformation matrix as a spatial transformation matrix of the present embodiment is applied when performing affine transformation in units of local regions, as disclosed in Non-Patent Document 1.

The rhombus within the left rectangle of FIG. 4A shows an example of an extraction source image when a local region is affine-transformed based on a given variation attribute (1). The rectangle having 25×25 pixels is a rectangle circumscribed on the rhombus, and in the present embodiment, this rectangle is defined as an extracted region. The pixel values of the extracted rectangular region are lined up and vectorized, and represented by a vector v. Here, an intermediate rectangle having 20×20 pixels shown in FIG. 4A represents a shape of the local region in the normal state when there is no particular variation factor. This normal state rectangular region is vectorized and represented by a vector v' in the same manner.

Considering that the rhombus, which is the extraction source image, is deformed to the normal state as in Non-Patent Document 1, in the present embodiment, the vector v is transformed to the vector v'. In the present embodiment, such deformation is performed by introducing a so-called deformation matrix and performing calculation with a single matrix operation, rather than determining correspondence point coordinates through affine transformation each time and calculating a luminance value based on the position. In FIG. 4A, the deformation matrix is represented by $T_1$, and transformation from v to v' is calculated by the following equation: $v' = T_1 \cdot {}^t v$.

In this example, the vector v has a dimension of 25×25=625, and the vector v' has a dimension of 20×20=400, and as a result, the deformation matrix $T_1$ is a 625×400 dimensional matrix. In this specification, a generalized matrix for transforming a vector originally interpreted as a two dimensional array such as the deformation matrix into a vector that can be interpreted as another two dimensional array is referred to as a "spatial transformation matrix". Another example of a spatial transformation matrix will be described later.

The calculated vector v' corresponding to the normal state is projected onto a sub-space by the normal projection matrix $P_s$ calculated in advance through principle component analysis or the like using only normal state sample data, and a projection feature vector f is calculated by $f = P_s \cdot {}^t v'$.

Here, the deformation matrix $T_1$ can be calculated if correspondence points on the left rectangle that are the basis of vector v' elements are obtained. The method for creating a deformation matrix from correspondence points will be described later. A correspondence point list may be generated by first estimating affine parameters and performing affine transformation (inverse transformation) with respect to each of the pixel coordinates as described in Non-Patent Document 1. In other words, the configuration of the present embodiment can also be used to implement local deformation that is as efficient as affine transformation.

Figure 4B:
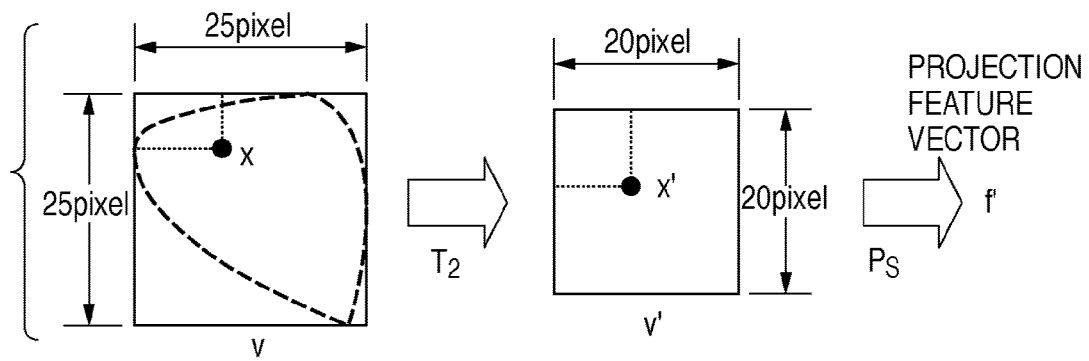

However, the fact that the deformation matrix can be created from a correspondence point list means that it is possible to cope with deformation of any shape without limitation to affine transformation. An example thereof is shown in FIG. 4B. The dotted region inscribed in the left rectangle shown in FIG. 4B shows a local region shape in the case of a given variation attribute (2). This rectangle can be transformed to a normal state vector v' with the use of $v'=T_2 \cdot {}^r v$ by introducing a deformation matrix $T_2$, as in the case of the variation attribute (1). The transformed vector v' is projected onto a sub-space by the normal projection matrix $P_s$, and a projection feature vector f' is calculated as in the case of the variation attribute (1).

Although in the images of the variation attribute (1) and the variation attribute (2), the original shapes of the local regions are different, these images are temporarily deformed to a shape corresponding to the normal state with the use of the corresponding deformation matrices $T_1$ and $T_2$. After that, projection is performed using the normal projection matrix $P_s$, and as a result, the two generated projection vectors f' are in the same sub-space irrespective of the variation attributes. Accordingly, these two vectors can be compared and a similarity calculation is possible if one of them is a registered feature vector, and the other is a feature vector to be identified.

Figure 6:
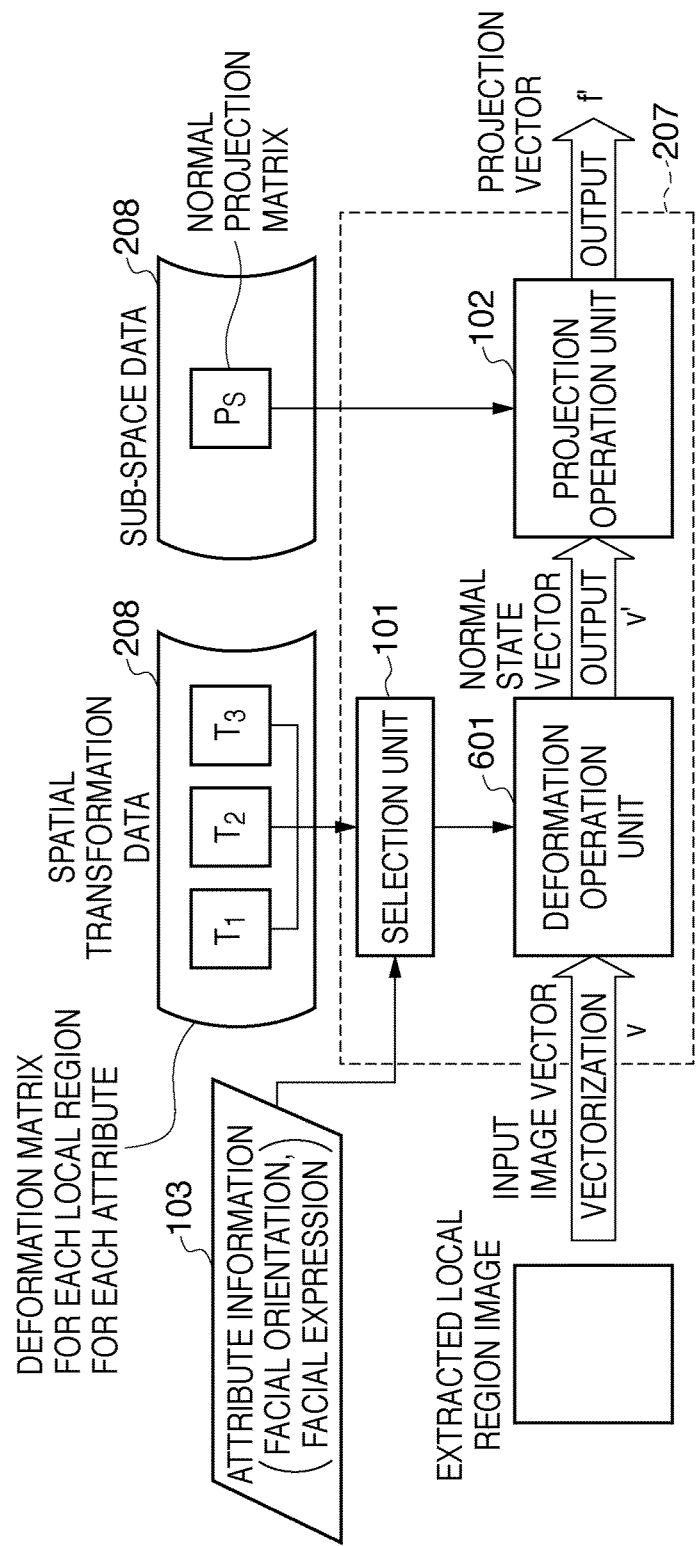
FIG. 6 is a block diagram showing another configuration of the feature vector calculation unit.

As described above, local region deformation processing using a deformation matrix based on attribute information is performed prior to the projection operation onto a feature vector. For this reason, the feature vector calculation unit 207 can be configured, for example, as shown in FIG. 6 including a deformation operation unit 601, instead of being configured as shown in FIG. 1A. The deformation operation unit 601 can be, for example, a large scale matrix product operation circuit, and generates a normal state vector v' corresponding to the normal state shape through multiplication of deformation matrix $T_n$ and input image vector v. The deformation matrix $T_n$ used here is selected by the selection unit 101 based on the attribute information 103 determined by the attribute determination unit 205. The deformation matrix corresponding to each attribute is held in the projection matrix storing unit 208 as spatial transformation data per local region. In other words, the projection matrix storing unit 208 holds, as correction parameters, a plurality of spatial transformation matrices for spatial transformation processing corresponding to respective variation attributes, as well as projection matrices for projection operation processing corresponding to images in which the target object is in a specific state (normal state). The deformation operation unit 601 performs spatial transformation processing on the input image vector v with the use of the selected deformation matrix, and generates a normal state vector v'. The generated normal state vector v' is projected by the projection operation unit 102 with the use of the normal projection matrix $P_s$ to obtain a projection feature vector f'.

With the configuration as described above, it is possible to cope with any deformation only by exchanging the spatial transformation data, or in other words, deformation matrices, in the same operation apparatus. Furthermore, it is possible to cope with not only deformations, but also with another spatial transformation processing, which will be described later, only by exchanging parameters.

Post-processing after the deformation operation unit 601 configured as described above is not limited to the projection operation unit 102. The deformation operation unit 601 can be applied to, for example, as described in Non-Patent Document 1, the case where similarity is calculated with the use of the sum of the absolute values of the differences between pixels without performing a projection, and is also applicable not only to recognition processing but also to various types of processing that require deformation such as image deformation. However, the spatial transformation matrix is a huge matrix including the number of input vector elements×the number of normal state vector elements, and therefore, the number of parameters that have to be held and the number of product-sum operations increase significantly as compared to the configuration of FIG. 1A depending on the size of the regions to be transformed. Accordingly, it is effective to use, for example, a method in which the parameters are held in a compressed form, and a dedicated product-sum operation circuit is introduced to perform parallel operation at high speed.

Method for Generating Deformation Matrix

A method for generating a deformation matrix will be described with reference to FIGS. 7, 8, 9, 11 and 12, and FIGS. 19A to 19B. As described previously, the deformation matrix according to the variation attributes of each local region can be generated from a list of correspondence points in a variation attribute local region corresponding to the points in a local region equivalent to a no-variation state. However, the correspondence point list used here is not a list of correspondence points between face images of a specific individual, but a list of correspondence points between variations of the face of a normal person that has been generalized (averaged). This correspondence point list can be generated through machine learning using pairs of a face image corresponding to a specific variation attribute and a normal state face image obtained from a large number of people as learning samples.

It is also of course possible to roughly classify images based on the type of face such as the race, the sex and the skeletal frame of the face, and learn the face images according to the type as a per-type specific variation attribute correspondence point list. By using a deformation matrix generated from this per-type correspondence point list together with a type determination unit, it is possible to expect further improvement in deformation accuracy.

Figure 7:
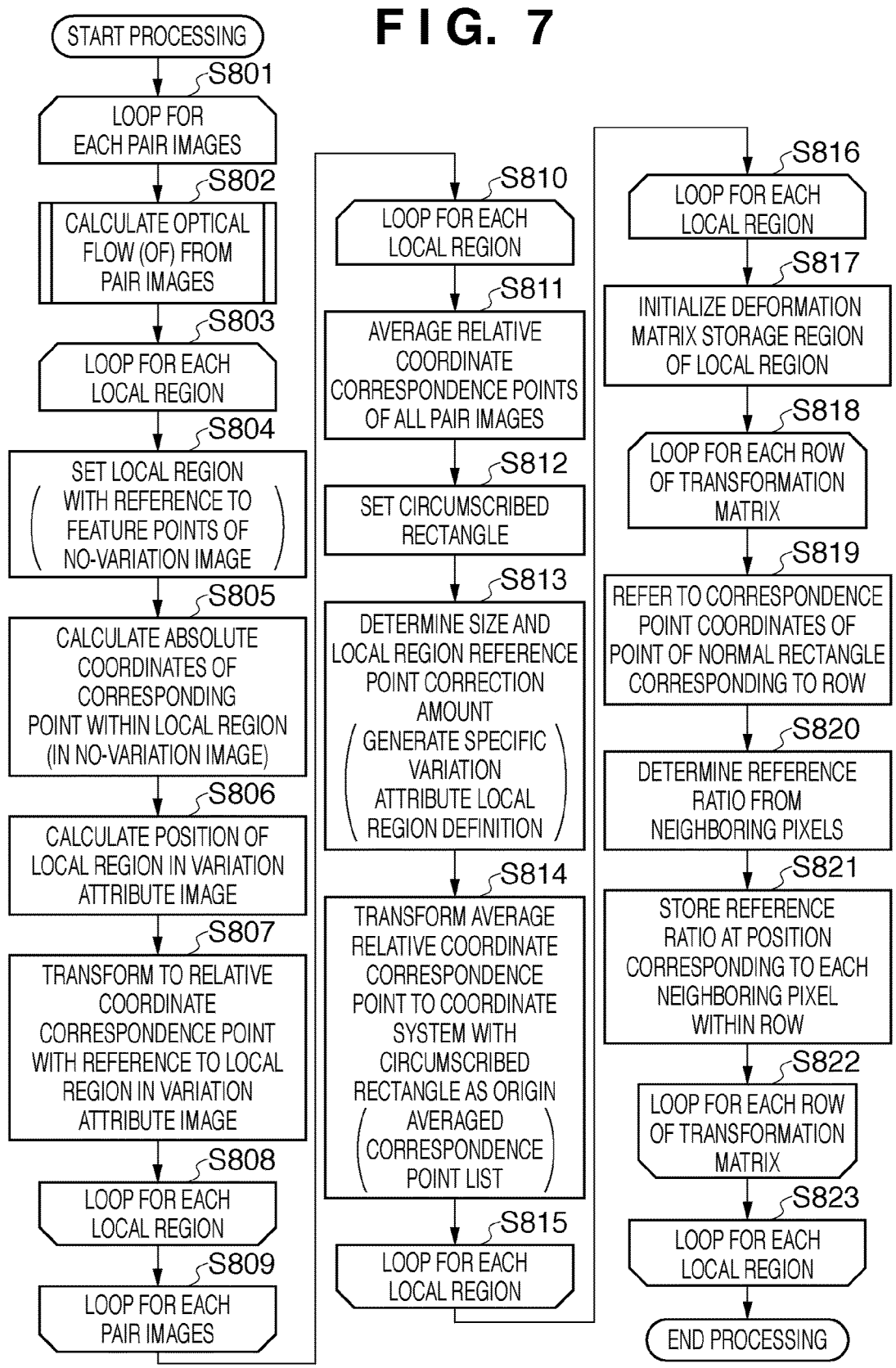
FIG. 7 is a flowchart showing an example of deformation matrix learning/generation processing.

It is not necessary to generate the deformation matrix T online during operation such as during registration or during identification, and thus it can be executed by software with the use of a general-purpose PC or the like. If corresponding variation attributes and learning data are massive, a super computer or a cluster computer may be used. An example of processing for generating a determination matrix of each local region corresponding to a given specific variation attribute through learning will be described with reference to the flowchart of FIG. 7. The steps shown in the flowchart of FIG. 7 are executed by a general-purpose PC or the like. It is assumed that there is only a normal state local region definition for each local region at the start of this processing, and a specific variation attribute local region definition will be generated within this processing together with a deformation matrix.

Prior to generation of a deformation matrix, it is necessary to prepare pairs of a specific variation face image to be learnt and a normal state face image obtained from a large number of people. Reference numeral 900 in FIG. 8 indicates that, as examples, a plurality of pairs of a face image in which the face has been turned to the left by 30 degrees as a variation attribute 1 and a frontal face image as a normal state have been prepared. Here, because it is desired to obtain only deformations due to a facial orientation factor, it is better to prepare only images that were captured in good photographic conditions (lighting, resolution) and that do not include other variation factors. If possible, sets of images captured in a studio or the like with correct facial orientation conditions are desirable.

Processing from Step S801 to Step S809 of FIG. 7 is a loop performed for each of the pair images as shown in 900 in FIG.

8. First, in Step S802, an optical flow is calculated from two images. The optical flow is a velocity field of the individual pixels when the image is continuously changing, and can be regarded as a representation of correspondence points between two images transformed to relative positions from respective pixel positions. In the present embodiment, the optical flow is calculated by regarding a normal state image as a current image and a specific variation image as a past image.

Various types of conventional techniques have been proposed as the method for calculating an optical flow from two images. For example, the method using a luminance gradient disclosed in Non-Patent Document 2 is a technique called Lucas-Kanade method, which is widely used for stereo matching, object tracking and the like as a high-speed method for finding correspondence points. Other than this, it is also possible to use a technique called block matching and a technique called phase-only correlation method to find correspondence points.

Figure 8:
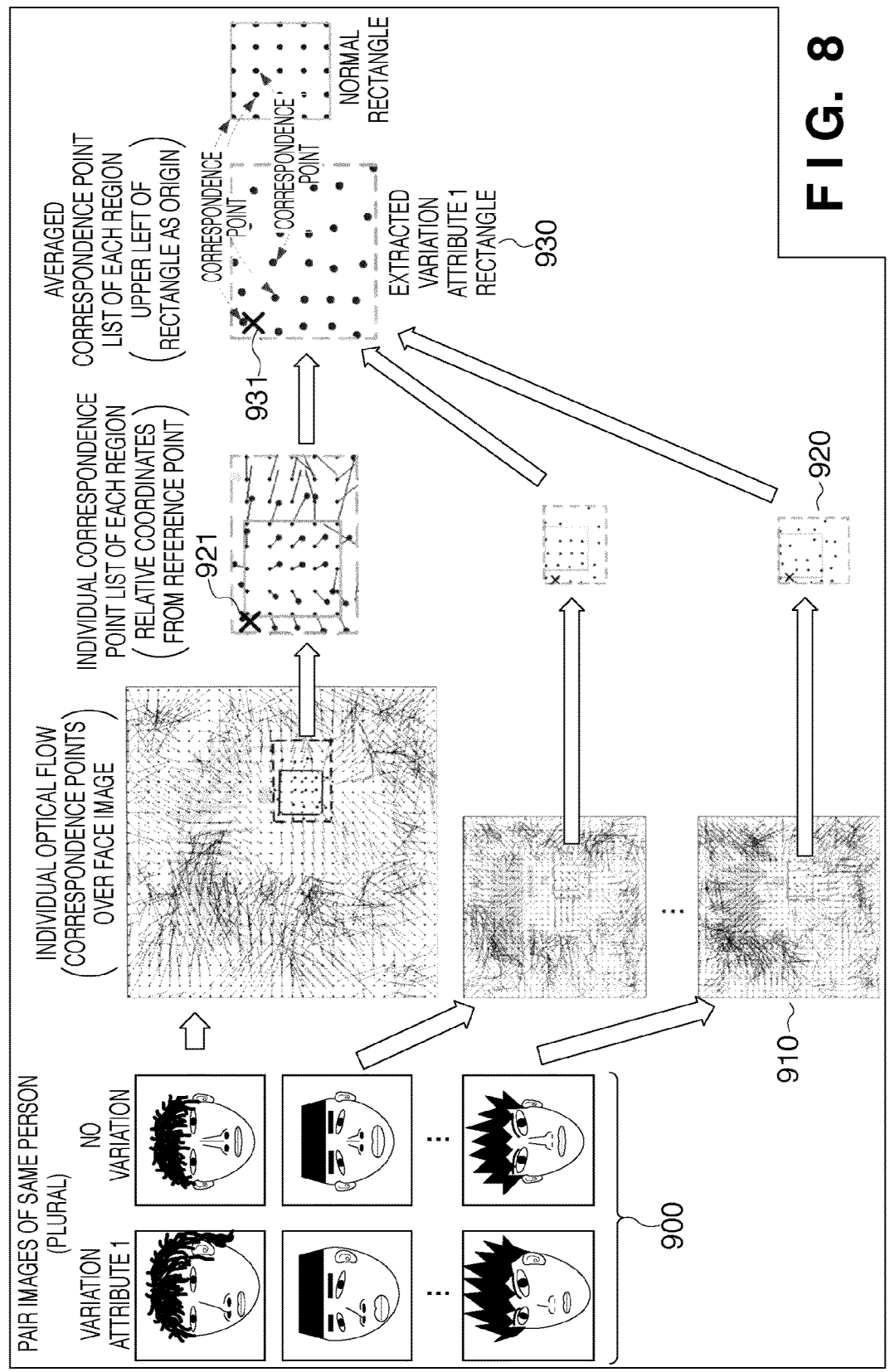
FIG. 8 is a schematic diagram showing an example of the flow of deformation matrix learning/generation processing.

Reference numeral 910 of FIG. 8 shows optical flow images generated from respective pair images shown in 900. In the top enlarged image, the black points indicate the pixel positions of the current image (=no-variation image), and the tip of the line segment extending from each black point like a "beard" indicates the correspondence point of the corresponding past image (=the image of variation attribute 1). Because each pixel has moved in a direction from the past image to the current image, in the velocity field, there is a backward vector of the "beard" for each pixel. In other words, the optical flow is a set of two-dimensional vectors for the current position pixels, and correspondence point coordinates in the past image can be acquired by subtracting the flow at that point from the current location coordinates.

Subsequently, processing from Step S803 to Step S808 is a loop performed for each local region. In Step S804, local region positions are calculated based on the feature points of the no-variation image by using local region definitions in the same manner as described in the identification processing and registration processing in the face image recognition processing apparatus of FIG. 2. The local region definitions used here are normal state local region definitions. As the feature points used as a reference, feature points detected in the same processing as that of the feature point detection unit 202 of the face image recognition processing apparatus of FIG. 2 may be used, or correct feature points that have separately been input and set may be used.

Then, in Step S805, a list of correspondence points in the image of variation attribute 1 corresponding to the points in the local region of the no-variation image is calculated. This correspondence point list includes absolute coordinates in the image of variation attribute 1, which is a coordinate value obtained by subtracting the optical flow value corresponding to each pixel with respect to each of the point coordinates of the local region. The solid-line frame shown in each optical flow shown in 910 of FIG. 8 corresponds to a local region in the no-variation image, and the point (indicated by a larger dot) at the tip of the "beard" line segment extending from each coordinate point (indicated by a smaller dot) corresponds to a correspondence point on the image of variation attribute 1. A rectangle circumscribed on the correspondence points is indicated by a broken line.

Figure 19A:
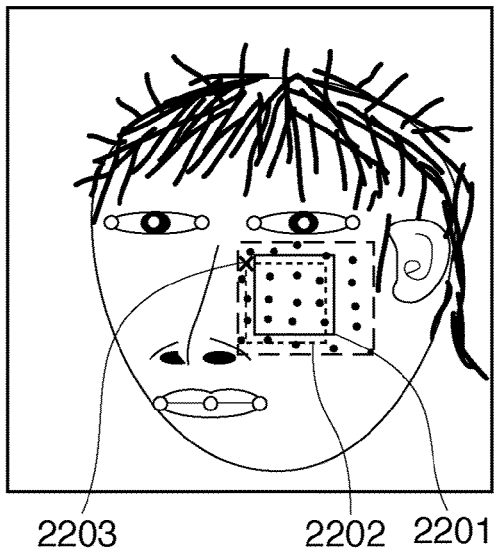
FIGS. 19A and 19B are diagrams illustrating an example in which the positions of local regions calculated using the same normal local region definition do not match in a specific variation image and a normal state image.
Figure 19B:
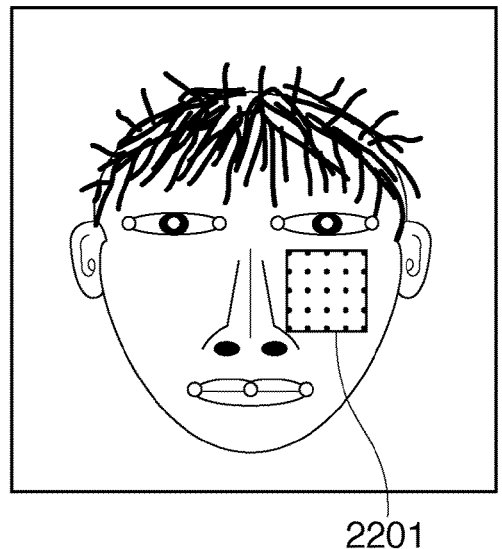

Next, in Step S806, the position of the local region in the image of variation attribute 1 is calculated. Here, specific variation attribute local region definitions have not yet been generated, and thus a starting point (the point located at the upper left of the rectangular region) of the region is calculated using a normal state local region definition based on feature points. Usually, the feature points in a variation attribute image do not match the feature points in a no-variation image in position except for the eyes serving as the normal position. Accordingly, even when the same normal state local region definition is used, the calculated coordinates of the starting point (upper left point) of the rectangular region do not match between the variation attribute image and the no-variation image. FIGS. 19A and 19B are diagrams illustrating this. In FIGS. 19A and 19B, a rectangle 2201 is an example of a local region set based on the feature points in the no-variation image by using a given normal state local region definition (referred to as "region A"). A rectangular region 2202 is a local region set based on the feature points in the image of variation attribute 1 by using the same normal state local region definition. The region A is defined so as to be determined based on the positions of the outer corners of the eyes and the position of the mouth, and because the coordinates of these feature points are different in the two images, it can be seen that the position of the rectangle 2201 and that of the rectangular region 2202 do not match. The starting point (upper left point) of the rectangular region 2202 calculated using the feature points in the image of variation attribute 1 is indicated by a cross (×) 2203. This is the same as a cross (×) 921 of FIG. 8.

In the subsequent Step S807, the correspondence point list including absolute coordinates extracted in Step S805 is transformed to relative coordinates with the starting point (i.e., the cross 921) of the local region in the image of variation attribute 1 calculated in Step S806 set as a reference point. This transformation is performed by subtracting the reference point coordinates from each absolute coordinate value. In other words, in 920 of FIG. 8, the coordinate value of a dot (larger dot) at the tip of each beard line segment is represented by relative coordinates with reference to the cross 921, and thus there are correspondence points having negative coordinate values. The reference point is at a coordinate position (x, y)=(0, 0). The relative coordinate list calculated here is temporarily stored, then, the same processing is performed on each local region and each pair images, and the loop ends.

Processing from Step S810 to Step S815 is again a processing loop performed in units of local regions. In this processing loop, the correspondence point list of each pair images generated from Step S801 to S809 is averaged to generate an average correspondence point list for each local region. Firstly, in Step S811, the correspondence point coordinates are averaged by referencing the relative coordinate correspondence point list of the local region of all pair images that are temporarily stored. Specifically, the relative coordinates correspondence points corresponding to respective pixels of the normal rectangle are added, which is divided by the number of pair images, and thereby an averaged relative coordinate correspondence point list can be generated. In this processing, each correspondence point list shown in 920 of FIG. 8 is averaged by matching the starting point with the starting point indicated by the cross 921, and as a result, a correspondence point list including negative coordinates with a cross (×) 931 as the starting point as shown in 930 of FIG. 8 is generated.

In Step S812, a circumscribed rectangle of the averaged correspondence point list is calculated. In this processing, with respect to all averaged correspondence point coordinates, a minimum value and a maximum value are obtained for each of the x direction and the y direction. A starting point (upper left point) of the circumscribed rectangle is determined by the minimum value $x_{min}$ of the x coordinate and the minimum value $y_{min}$ of the y coordinate, a width w of the rectangle is determined by the difference between the minimum value $x_{min}$ and the maximum value $x_{max}$ of the x coordinate, and a height h of the rectangle is determined by the difference between the minimum value $y_{min}$ and the maximum value $y_{max}$ of the y coordinate.

In Step S813, based on this circumscribed rectangle, a specific variation attribute local region definition is generated from the normal state local region definition. Here, the circumscribed rectangle represents an extracted local region in the variation attribute image. Accordingly, it is necessary to set the upper left position as the starting point of the rectangle. The origin (0, 0) generated in Step S811, or in other words, the cross 931 in 930 of FIG. 8, is the starting point of the local region set in the variation attribute state image by using the normal state local region definition, and therefore correction is performed such that this point becomes the starting point of the circumscribed rectangle. In other words, the specific variation attribute local region definition is defined such that a result obtained by adding $x_{min}$ and $y_{min}$ to the result of starting point position calculation using the normal state local region definition is calculated as a starting point position. The extraction size is set to the same as the size of the circumscribed rectangle.

Next, in Step S814, the average relative coordinate correspondence point calculated in Step S811 is transformed to coordinates with the starting point of the circumscribed rectangle as the origin. This corresponds to the processing for subtracting $x_{min}$, $y_{min}$ with respect to each coordinate value. In other words, with this processing, all correspondence point coordinate values use the starting point of the circumscribed rectangle indicated by the broken line shown in 930 of FIG. 8 as the origin, and thus there will be no negative coordinate value. The calculated average correspondence point list is temporarily stored.

By repeating the processing up to Step S815, the specific variation attribute local region definition and the correspondence point list for deformation to the normal state are generated for all local regions. Next, in the processing loop from Step S816 to S823, deformation matrices corresponding to the specific variation attributes of the individual local regions are generated. FIGS. 9 and 11 are diagrams showing how a deformation matrix is generated from the correspondence point list.

Reference numeral 1000 of FIG. 9 graphically represents a correspondence point list to be deformed to the normal state for a given variation attribute, similar to 930 of FIG. 8. The closed region within the left rectangle is a region having a shape before deformation including the individual points, and the right rectangle is a normal shape. The extraction region before deformation is a rectangle circumscribed on the closed region, and has a size of 25×25 pixels in the example of FIG. 9. The normal state-equivalent rectangle after deformation has a size of 20×20 pixels in the same example. For each point x' within the normal shape, there are correspondence point coordinates x that take on real values. In other words, the correspondence point list includes 400 correspondence point coordinates, and coordinate values of x and y each take on real values from 0.0 to 25.0. Reference numeral 1001 of FIG. 9 shows the coordinates in the form of a table, and the actual correspondence point list data is held in memory in the form of a table.

In Step S817, a region for storing a deformation matrix is secured and initialized. As described previously, the deformation matrix is a huge matrix including the number of pixels in undeformed local regions×the number of pixels in deformed local regions, but most of the values take on 0, and thus all element values are initially cleared to 0.

In a processing loop from Step S818 to S822, processing for setting the element values for each row of the deformation matrix is performed. Each row of the deformation matrix can be considered to be equivalent to a luminance value transformation filter having the same size as a local region rectangle of a specific variation attribute that is input. Examples of the luminance value transformation filter are shown in 1201 of FIG. 11. One of the filters shown in FIG. 11 represents luminance transformation for one pixel of a rectangle after deformation, the position shown by hatching corresponds to a reference point position within the rectangle before deformation, and the reference ratio is set as a coefficient of the filter. The coefficients of white portions are all 0.

The reference ratio coefficient is calculated using the real value coordinates held in the correspondence point list. For example, the correspondence point coordinates x that correspond to the coordinates x'=(1, 0) after deformation of FIG. 9 are (1.2, 0.3), which corresponds to the position shown in 1002. Because the actual pixel values are present in the surrounding integer coordinates, the reference ratio can be calculated according to the distance from predetermined surrounding pixels. Reference numeral 1002 shows an example of so-called bilinear interpolation in which four neighboring pixels are referenced. In other words, luminance value $I'_{1,0}$ at coordinates (1, 0) after deformation corresponds to luminance value $I_{1.2,0.3}$ at coordinates (1.2, 0.3) before deformation. The luminance value $I_{1.2,0.3}$ can be calculated by multiplying the luminance values $I_{1,0}$, $I_{2,0}$, $I_{1,1}$, and $I_{2,1}$ of the four surrounding pixels by a weight according to the distance and adding the results.

$$I_{1.2,0.3} = (1-0.3)((2-1.2)I_{1,0} + (1.2-1)I_{2,0}) +$$
$$(0.3-0)((2-1.2)I_{1,1} + (1.2-1)I_{2,1})$$
$$= 0.56I_{1,0} + 0.14I_{2,0} + 0.24I_{1,1} + 0.06I_{2,1}$$

In other words, this example corresponds to the bottom luminance transformation filter shown in 1201 of FIG. 11, and reference ratios 0.56, 0.14, 0.24 and 0.06 are stored at the positions of (1, 0), (2, 0), (1, 1) and (2, 1) before deformation, respectively as coefficients. This is an example of bilinear interpolation, but in the case of bicubic interpolation, the reference ratio can be calculated using 16 neighboring pixels. Alternatively, only one nearest pixel may be referenced. In this case, only the reference ratio of $I_{1,0}$ takes on 1.0, and the reference ratios of other pixels are all 0.

In the face image recognition apparatus of the present embodiment, input local regions are vectorized and processed as shown in FIG. 10, and therefore luminance transformation filters are also vectorized. An example thereof is a luminance value transformation vector shown in 1202 of FIG. 11. Each row of the deformation matrix becomes a luminance value transformation vector. In other words, in the deformation matrix T, luminance value transformation vectors $t_{0,0}$ to $t_{19,19}$ are vertically arranged. This is shown in 1203 of FIG. 12. In steps from Step S819 to Step S821, the processing described above with reference to FIGS. 9 and 11 is executed.

In Step S819, corresponding coordinates of a point after deformation (=normal state rectangle) corresponding to each row of the deformation matrix are referenced from the correspondence point list shown in 1001 of FIG. 9. Then, as described with reference to 1002, in Step S820, a reference ratio according to the distance from predetermined neighboring pixels is calculated. In Step S821, the reference ratio calculated in Step S820 is stored at a position corresponding to the reference pixel of the row of the deformation matrix, which is a luminance transformation vector.

By repeating the above processing up to Step S822, a deformation matrix for one local region is completed. Then, processing up to Step S823 is performed on all local regions, and thereby deformation matrices for all regions are generated.

In the optical flow calculation performed in Step S802, it is possible to further use an intermediate image between the specific variation image and the no-variation image. The flow from the specific variation image to the intermediate image, and the flow from the intermediate image to the no-variation image are calculated stepwise, a flow in which these flows are synthesized is generated, and by using this flow in the subsequent processing, a more accurate correspondence point list can be calculated.

The method for generating a correspondence point list is not limited to the method from Step S801 to Step S815. For example, the correspondence point may be generated by estimating affine parameters for each local region and performing an affine transformation as shown in Non-Patent Document 1. Alternatively, instead of affine transformation, other deformation methods can be used such as bilinear transformation (trapezoidal transformation). When the type of deformation is limited in this manner, there is a possibility that it is possible to reduce errors for noisy images, but it may not be possible to cope with deformation of complex shapes.

FIG. 12 shows a deformation operation using the generated deformation matrix T. A product $T \cdot {}^t v$ of deformation matrix T and input vector v is a luminance transformation vector for each row of the deformation matrix, and thus in this example, a 400 dimensional vector is generated in which inner product values of luminance transformation vector $t_{x,y}$ and input vector v are lined up. The transformed image vector thus generated can be interpreted as being arranged in a predetermined two-dimensional shape in a predetermined order, thereby generating a deformation image. In the example of FIG. 12, when pixels are arranged in units of 20 pixels in a rectangular shape, this processing can be regarded as equivalent to processing in which a rectangle of 20×20 pixels is deformed to a no-variation-equivalent rectangle. Of course, in the present embodiment, because the subsequent processing is also performed in the form of a vector, it is unnecessary to arrange pixels in a rectangular shape but when the result of deformation is used as an image, this arrangement processing is necessary.

In FIG. 9, an example is shown in which a horizontal orientation variation of the face is used as the variation attribute, but it is clearly understood that the technique of the present embodiment is not limited thereto. If learning data can be prepared, a vertical orientation variation can be used as the variation attribute, and it is of course possible to generate deformation matrices by setting a smiling face as the variation attribute and learning deformation to a no-facial expression as the normal state.

It is also possible to perform a plurality of deformations in a stepwise manner. For example, an example can be conceived in which local regions of a left-looking smiling face image are deformed to a frontal face orientation, and then deformed to a no-facial expression. Furthermore, by using a synthesized matrix which will be described later, it is also possible to perform a plurality of deformations with a single operation.

Integration of Deformation Matrix and Projection Matrix

Next, a description will be given of generation of a per-variation attribute projection matrix using the feature vector calculation unit 207 configured as shown in FIG. 1A, rather than FIG. 6.

In the face image recognition processing apparatus of the present embodiment, the deformation operation using the deformation matrix $T_n$ and the projection operation using the normal state projection matrix $P_s$ shown in FIGS. 4A and 4B are performed in sequence. As described above, $T_n$ is a matrix including the number of pixels in extracted specific variation rectangles×the number of pixels in normal state rectangles, and $P_s$ is a matrix including the number of pixels in normal state rectangles×projection dimensionality. In the examples of FIGS. 4A and 4B, $T_1$ and $T_2$ have a dimension of 625×400, and $P_s$ has a dimension of, for example, 400×20. Transformation from the input vector v to the projection vector f' can be expressed by the following equation:

$$f' = P_s \cdot {}^t v' = P_s \cdot T_n \cdot v.$$

In other words, $T_n$ and $P_s$ can be synthesized by a matrix product operation.

$$P_n = P_s \cdot T_n$$

If the synthesized projection matrix $P_n$ is a projection matrix corresponding to a variation attribute n, the feature vector calculation unit 207 configured as shown in FIG. 1A can be used. At this time, the transformations shown in FIGS. 4A and 4B are as shown in FIGS. 4C and 4D, and by using their corresponding synthesized projection matrices $P_1$ and $P_2$, a calculation that is exactly equivalent to that of FIGS. 4A and 4B can be performed with a single projection operation.

Figure 4C:
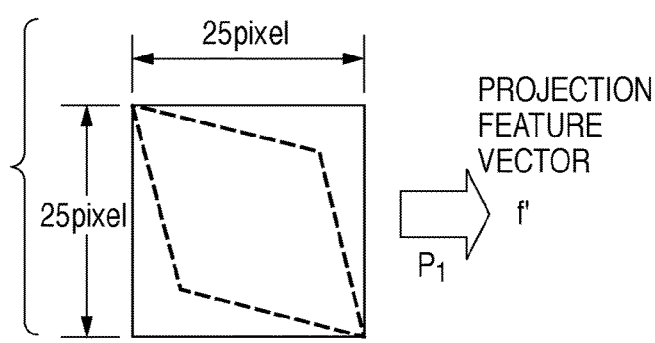
Figure 4D:
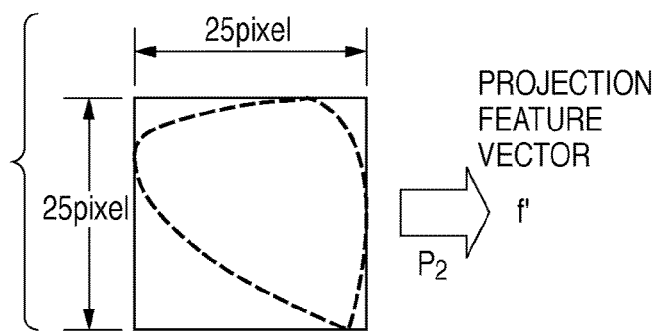

Here, the synthesized projection matrix $P_n$ has a dimension of 625×20 in the examples of FIGS. 4C and 4D, and thus is a parameter that is much smaller than in the case where the 625×400 dimensional deformation matrix $T_n$ is held without being processed. In addition, because the deformation operation unit 601 of FIG. 6 is unnecessary, the effects of reducing the number of processing circuits and the effects of accelerating calculations are extremely high, and it is possible to cope with deformations using a feature vector calculation unit having a size almost identical to that of the ordinary feature vector calculation unit shown in FIG. 3. In other words, the feature vector calculation unit is not limited to the present embodiment, and when the present invention is applied to processing in which some kind of projection operation is performed after deformation processing, the deformation matrix and the projection matrix can be synthesized and held. Also, by employing a configuration in which a synthesized projection matrix is selected as necessary, an extremely efficient processing apparatus (and method) can be implemented.

Embodiment 2

In Embodiment 1, deformation processing is used as the spatial transformation processing, but the present invention is not limited thereto. In Embodiment 2, an example will be described in which linear spatial filter processing is used as the spatial transformation processing. The spatial transformation matrix at this time is a filter processing matrix. More specifically, the spatial transformation matrix of Embodiment 2 is a matrix with which it is possible to perform filter processing for an entire local region with a single operation, or in other words, an all-pass filter processing matrix.

FIG. 13A shows a filter kernel of a Gaussian filter (smoothing filter) having 3×3 coefficients that is a type of linear spatial filter. The coefficients in the various blocks each represent the reference ratio between the pixel at the center position of the block and the surrounding pixels (actually, 1/16 of that value is stored). In order to cause such filter coefficients to operate, as in the case of the deformation matrix of FIG. 11, when each pixel after filter processing is luminance value transformed, a filter as shown in 1501 of FIG. 14 is obtained. In the filter processing, because the rectangle size is the same before and after transformation, and thus the size of each luminance value transformation filter 1501 is also the same as the size (20×20 pixels) of the transformed rectangle. In this luminance value transformation filter, simply, the coefficients of FIG. 14 are relatively arranged using the position of each transformed pixel as a pixel of interest. As in the case of deformation, the other elements all have 0.

By vectorizing this luminance value transformation filter as in the case of deformation, a luminance value transformation vector 1502 can be generated. By arranging luminance value transformation vectors of all transformed pixels in the same manner, an all-pass filter processing matrix (a local region smoothing matrix 1503 in this example) can be generated.

Figure 20:
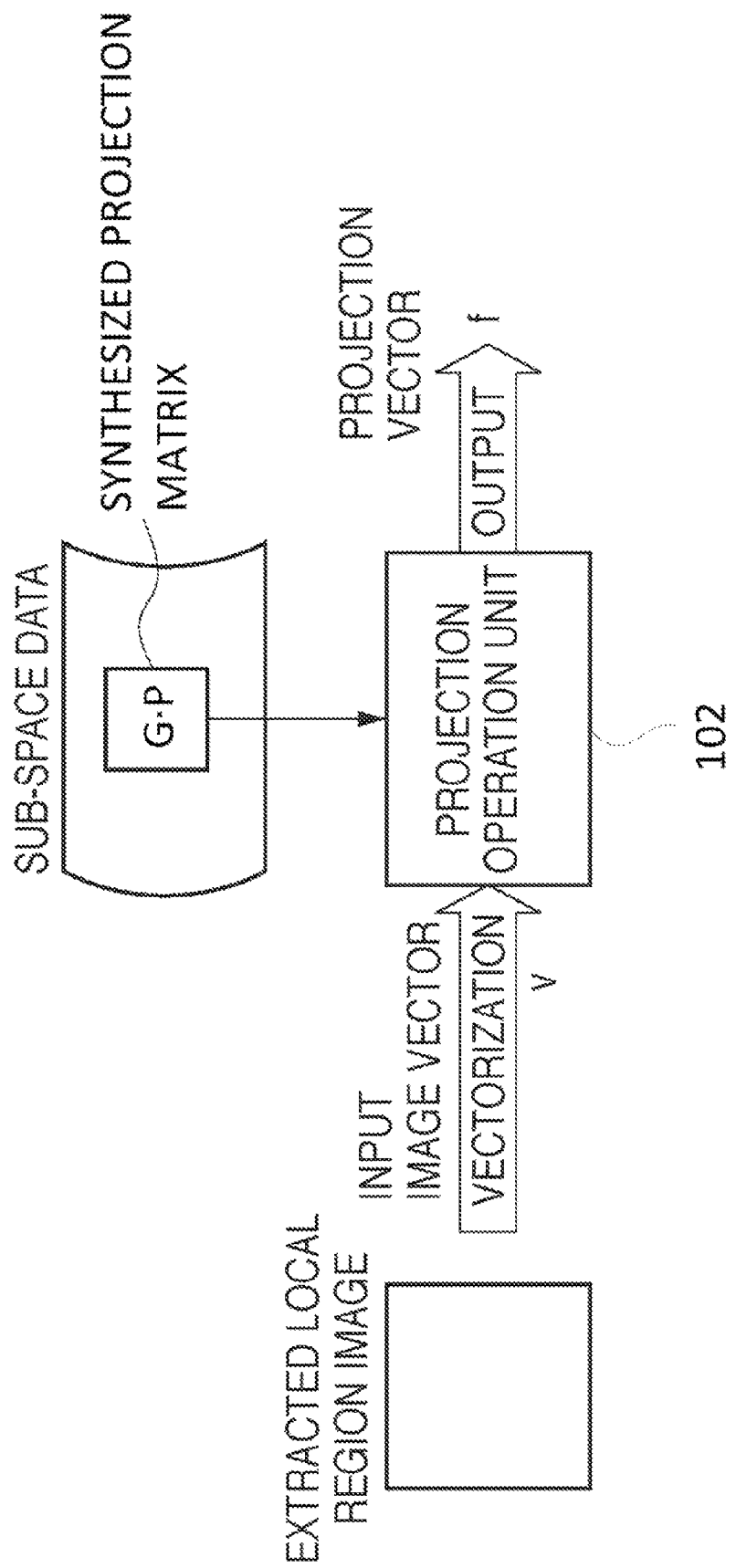
FIG. 20 is a block diagram showing an example of feature vector calculation according to an example embodiment.

In the case of the example shown in FIG. 14, the all-pass filter processing matrix G is a 400×400 dimensional square matrix, and can be used in the operation of the deformation operation unit 601 of FIG. 6 as in the case of the deformation matrix. Alternatively, as in the case of the deformation matrix, by synthesizing it with the subsequent projection matrix as shown in FIG. 20, projection operation is possible with the feature vector calculation unit 207 (the projection operation unit 102) configured as shown in FIG. 1A.

In the face recognition processing, smoothing as shown in FIG. 14 is required when, for example, an image having a high resolution with respect to the registered image (normal state) is input as a target to be identified. In such a case, frequency components of the input image are checked, and if a high frequency component is included, the attribute is determined as a high frequency image.

It is of course possible to use a linear spatial filter other than the Gaussian filter as shown in FIG. 13B. Two filters shown in 1601 are a vertical direction edge detection filter and a horizontal direction edge detection filter, respectively. Reference numeral 1602 indicates a Laplacian filter that performs transformation to an edge image. These filters may be executed as a part of feature vector extraction processing irrespective of the attribute, but it is needless to say that the present invention is applicable by similarly generating an all-pass filter processing matrix.

Embodiment 3

Luminance Distribution Correction

The present invention can also be applied to processing for correcting a luminance distribution within a local region. For example, in the case of the human face, when there is a light source in either the right or left direction, the shadow from the nose is likely to appear. Accordingly, in the case of estimating the light source direction as a variation attribute, it may be effective to perform luminance distribution correction such as increasing the luminance of the pixels in the regions located in the shadow of the nose.

Reference numeral 1701 in FIG. 15 is a luminance correction distribution table of a local region in the case of a given variation attribute, and the coefficient at each position indicates a luminance transformation coefficient that is multiplied with the corresponding pixel. In other words, the pixels in the right side region of 1701 are likely to be the shadow, and thus larger coefficients are set to increase the luminance values. The pixels in the left side region are unlikely to be the shadow, and thus smaller coefficients are set. Unlike the luminance value transformation filters shown in 1201 and 1501, in the luminance correction distribution table 1701, each pixel within the region references only the coefficient at the same position. In other words, as shown in 1702, each luminance value transformation vector stores only the coefficient of one element of the table.

A luminance distribution correction matrix D can be generated by vertically arranging the luminance value transformation vectors thus generated in the same manner as in Embodiments 1 and 2. As shown in FIG. 15, the luminance distribution correction matrix D is a 400×400 dimensional square matrix whose size is the same before and after transformation, as with the all-pass filter processing matrix G.

It should be noted that the technique of the present embodiment cannot cope with the case where it is necessary to perform not only the multiplication of coefficients but also the addition of offsets to correct a luminance distribution. In this case, it is necessary to perform pre-processing that performs addition of an offset to each pixel of untransformed local regions, but because the addition processing is performed as many times as the number of pixels, the processing load will not be so large.

Embodiment 4

Synthesized Spatial Transformation Matrix

The spatial transformation matrix can be a synthesized spatial transformation matrix generated by synthesizing a plurality of spatial transformation matrices. For example, a case is considered where smoothing filter processing using the smoothing matrix G (1503) of FIG. 14 is performed on the local region image that has undergone deformation processing using the deformation matrix T 1203 of FIG. 11, and then luminance distribution correction using the luminance distribution correction matrix D 1703 of FIG. 15 is performed on the same. In this case, the transformed vector v' that needs to be obtained is calculated by: $v' = D \cdot G \cdot T \cdot {}^t v = C \cdot {}^t v$, and thus by calculating a spatial transformation matrix C in advance by: $C = D \cdot G \cdot T$, transformation processing can be performed with a single matrix operation as in other embodiments.

Other Embodiments

Bus Connection Configuration

Figure 16:
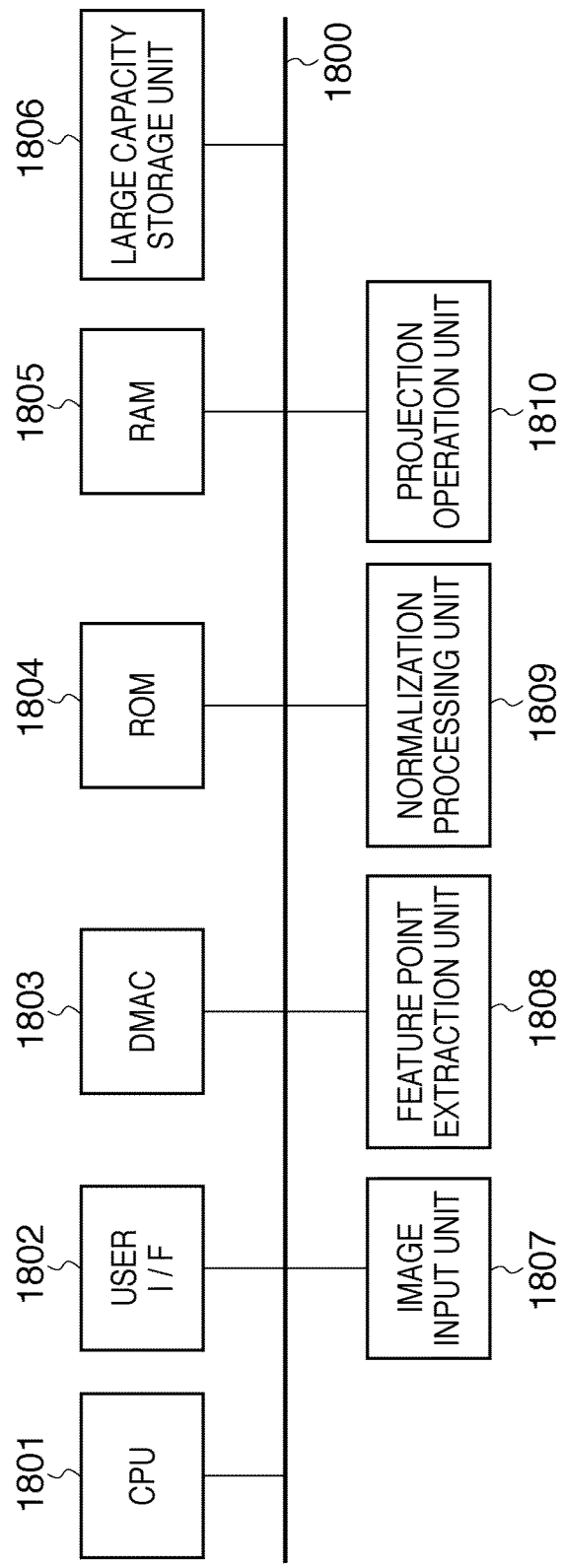
FIG. 16 is a block diagram showing an example of a configuration of an image processing apparatus.

As an embodiment of the present invention, the processing units in the block diagram shown in FIG. 2 may be implemented with only hardware processing circuits, but it is also of course possible to construct them as a system using a general purpose CPU. FIG. 16 is a block diagram showing an example of an information processing apparatus that functions as an image identification apparatus according to an embodiment of the present invention. The image processing apparatus of the present embodiment is operated by a CPU 1801 controlling constituent units connected via a CPU bus 1800. The following is a description of the constituent units.

A user I/F unit 1802 is configured of an input device, such as a keyboard, and an output device, such as a display, and this unit is used such that the user can input instructions to the image processing apparatus and that results of processing are presented to the user. The instructions input here are transmitted to the CPU 1801, interpreted, and used as a trigger for subsequent processing. With settings made in advance by the CPU 1801, a DMAC 1803 can perform data transfer between units without involving the CPU 1801. A ROM 1804 stores programs run by the CPU 1801 and fixed parameters that are necessary for various types of processing. A RAM 1805 is used as a work area when performing each processing and a storage area for temporarily storing data. It should be noted that additional built-in local RAM may be provided for each processing. A large capacity storage unit 1806 is configured of, for example, a hard disk drive (HDD) or the like.

An image input unit 1807 corresponds to the image input unit 201 of FIG. 2, and is a processing unit equipped with an I/F capable of connecting to a bus 1800. Image data received by the image input unit 1807 is temporarily stored in the RAM 1805 or the large capacity storage unit 1806 via the bus 1800. The image data transfer at this time is performed using the DMAC 1803. A feature point extraction unit 1808 corresponds to the feature point detection unit 202 of FIG. 2. The feature point extraction unit 1808 performs feature point detection processing on the face image stored in the RAM 1805 or the large capacity storage unit 1806. A normalization processing unit 1809 performs the same processing as that performed by the normalizing unit 203 of FIG. 2. Specifically, face image normalization processing using affine transformation and feature point coordinate transformation processing described in Embodiment 1 are performed. A projection operation unit 1810 generates a feature vector by projecting the input vector of each local region and performing dimensional reduction, as with the feature vector calculation unit 207 of FIG. 2.

The calculation of local region position, the attribute determination, the similarity calculation, the result integration, and the final determination are executed by the CPU 1801 using a part of the RAM 1805 as a work area. The extraction of the pixels of each local region can be implemented by the CPU 1801 setting parameters for transfer to the DMAC 1803 based on the result of the calculation of local region position, and sequentially transferring each pixel of the local region of the processed image stored in the RAM 1805 to the projection operation unit 1810.

Figure 18:
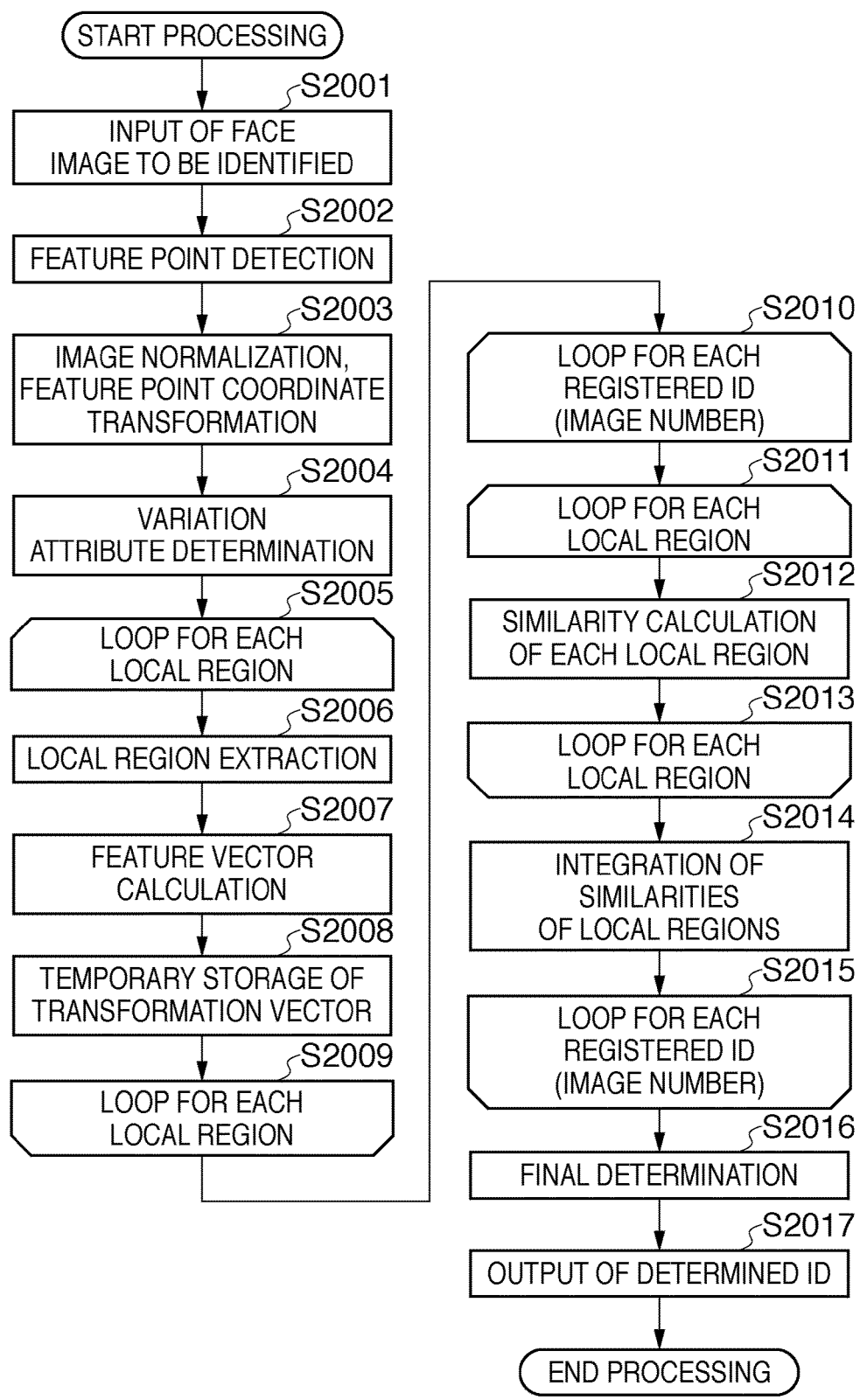
FIG. 18 is a flowchart illustrating processing performed during an identification processing operation mode.

Processing of a program executed in the system according to the present embodiment is the same as the registration processing and identification processing shown in FIGS. 17 and 18, and thus a detailed description thereof is omitted here. The parameters used in each unit, such as the projection matrix, are the same those of Embodiments 1 to 4.

When an image processing apparatus is constructed as a system using a general purpose CPU as in the present embodiment, each processing can be customized after completion of the hardware, and therefore a more flexible system can be constructed. Furthermore, by exchanging the parameters, the system can be used as an image identification apparatus that implements processing for identifying similar images other than face images, such as processing for determining the type of an automobile. If a CPU having a sufficient processing performance can be used such as a high-specification PC, it is of course possible to omit the dedicated hardware indicated by 1808 to 1810, and all of the processing may be performed by software.

In the foregoing, for the sake of simplicity of the description, all of the processing is performed on a partial region such as a local region, but it is obvious that the processing is applicable across the input image. However, it requires huge amounts of input and output, and therefore processable size will be limited depending on the size of the processing apparatus and processing time, and the like.

The above embodiments were described mainly using face authentication processing for identifying an individual from a face image, but the application of the image identification processing method of the present invention is not limited thereto. Needless to say, the present invention is applicable to many image identification processings for identifying similar patterns such as determining the type of a vehicle, or determining the type of a butterfly using the pattern on the wings of a butterfly.

The spatial transformation processing of the present invention can of course be applied to not only image recognition processing, but also to other various types of image processing that require spatial transformation processing. Furthermore, it is also obvious that the projection processing as post-processing that is integrated to the spatial transformation processing is not limited to the dimensional reduction projection processing, and linear projection processing for any purpose can be used.

In the embodiments, block diagrams showing the concept of implementation with hardware and an example of implementation as a system using a CPU are shown, but the application of the present invention is not dependent on the implementation method, and the processing method itself is also covered. As other examples of implementation, a DSP (digital signal processor) may be used to calculate a part of processing, or it can of course be applied in a distributed processing system connected via a network. For example, a system is conceivable in which an image input from a client is identified by the server.

As described above, according to the embodiments described above, it is possible to provide an image processing apparatus or an image transformation processing method in which it is possible to flexibly cope with various types of deformations using the same calculation method and apparatus only by exchanging parameters. This image processing apparatus or image transformation processing method can cope with not only deformations, but also various types of spatial transformation processing including linear spatial filter processing and luminance distribution correction processing, or synthesis processing thereof only by exchanging parameters. In addition, it is possible to provide an image processing apparatus or an image transformation processing method in which it is possible to simultaneously perform spatial transformation processing and the subsequent projection processing such as dimensional reduction processing without significantly increasing processing loads while minimizing the increase of parameters.

According to the present invention, a method and an apparatus are provided with which it is possible to perform various types of spatial transformation processing, such as image deformation, linear spatial filter processing and luminance distribution correction processing, without increasing parameters and processing loads.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240874, filed on Oct. 19, 2009, which is hereby incorporated by reference herein in its entirety.

What is claimed is:

1. An image processing apparatus comprising:
a holding unit configured to hold a plurality of spatial transformation matrices for spatial transformation, and a projection matrix for projection operation;
a vectorizing unit configured to generate an input image vector by vectorizing at least a partial region of an input image;
a determination unit configured to determine a variation attribute by detecting a variation of a target object from a specific state in the input image; and
a generation unit configured to select one of the plurality of spatial transformation matrices based on the variation attribute determined by the determination unit, and to generate a transformed image vector by performing the spatial transformation on the input image vector using the selected spatial transformation matrix and to generate a projection vector by performing the projection operation on the transformed vector, using the projection matrix,
wherein in the spatial transformation matrices,
rows correspond to elements of the transformed image vector,
elements of the rows correspond to elements of the input image vector, and
in each row, only elements that are referenced when calculating an element value corresponding to the transformed image vector have a value indicating a reference ratio, and the other elements all have a value of 0.

2. An image processing apparatus comprising:
a holding unit configured to hold a plurality of synthesized projection matrices in which each of a plurality of spatial transformation matrices for each attribute and a normal state projection matrix for projection operation have been synthesized;
a vectorizing unit configured to generate an input image vector by vectorizing at least a partial region of an input image;
a determination unit configured to determine a variation attribute by detecting a variation of a target object from a specific state in the input image; and
a generation unit configured to select one of the plurality of synthesized projection matrices based on the variation attribute determined by the determination unit, and to generate a projection vector by performing the spatial transformation and the projection operation on the input image vector, using the selected synthesized projection matrix.

3. An image processing apparatus comprising:
a holding unit configured to hold a spatial transformation matrix for spatial transformation;
a vectorizing unit configured to generate an input image vector by vectorizing at least a partial region of an input image; and
a generation unit configured to generate a transformed image vector by performing the spatial transformation, using the spatial transformation matrix,
wherein in the spatial transformation matrix,
rows correspond to elements of the transformed image vector,
elements of the rows correspond to elements of the input image vector, and
in each row, only elements that are referenced when calculating an element value corresponding to the transformed image vector have a value indicating a reference ratio, and the other elements all have a value of 0.

4. The apparatus according to claim 3,
wherein the spatial transformation matrix is a deformation matrix that causes a shape in a varied state to be deformed to a shape in the specific state.

5. The apparatus according to claim 4,
wherein the reference ratio of the deformation matrix is set based on a relationship between pixels of an image corresponding to a fluctuated state and a coordinate position in an image corresponding to the specific state that have been obtained through learning using a plurality of pairs of an image corresponding to the varied state and an image corresponding to the specific state.

6. The apparatus according to claim 3,
wherein the spatial transformation matrix is a filter matrix that subjects the input image vector to linear spatial filter processing.

7. The apparatus according to claim 6,
wherein in the filter matrix,
in each row, in an element corresponding to the elements of the input image vector on which a filter kernel for a linear spatial filter processing operates, a coefficient corresponding to the filter kernel is set as a value indicating the reference ratio.

8. The apparatus according to claim 3,
wherein the spatial transformation matrix is a luminance distribution correction matrix that corrects a luminance distribution of the input image vector.

9. The apparatus according to claim 1, further comprising:
a registration unit in which the projection vector generated by the generation unit is registered;
a calculation unit configured to calculate similarity between a projection vector generated from a new input image by the generation unit and the projection vector registered in the registration unit; and
an identification unit configured to identify whether the new input image includes the target object based on the similarity calculated by the calculation unit.

10. An image processing method performed by an image processing apparatus including a holding unit configured to hold a plurality of spatial transformation matrices for spatial transformation and a projection matrix for projection operation, the method comprising the steps of:
generating an input image vector by vectorizing at least a partial region of an input image;
determining a variation attribute by detecting a variation of a target object from a specific state in the input image; and
selecting one of the plurality of spatial transformation matrices based on the variation attribute determined in the determination step, and generating a transformed image vector by performing the spatial transformation on the input image vector using the selected spatial transformation matrix and generating a projection vector by performing the projection operation on the transformed vector, using the projection matrix,
wherein in the spatial transformation matrices,
rows correspond to elements of the transformed image vector,
elements of the rows correspond to elements of the input image vector, and in each row, only elements that are referenced when calculating an element value corresponding to the transformed image vector have a value indicating a reference ratio, and the other elements all have a value of 0.

11. A non-transitory computer-readable storage medium storing a program for causing a computer to function as the units of the image processing apparatus according to claim 1.

12. An image processing apparatus comprising:
a holding unit configured to hold a deformation matrix so as to transform a deformed image into a non-deformed image;
a vectorizing unit configured to generate an input image vector by vectorizing at least a partial region of an input image; and
a generation unit configured to generate a transformed image vector by transforming the input image vector using the held deformation matrix,
wherein the deformation matrix includes a reference ratio of an element in the deformed image when calculating an element value corresponding to the element in the deformed image.

13. The apparatus according to claim 12, wherein the holding unit further holds a projection matrix for projection operation.

14. The apparatus according to claim 13, wherein the generation unit generates the projection vector by projecting the input image vector using a synthesized projection matrix which is generated by synthesizing the deformation matrix and the projection matrix by a matrix product operation.

15. An image processing method performed by an image processing apparatus including a holding unit configured to hold a plurality of synthesized projection matrices in which each of a plurality of spatial transformation matrices for each attribute and a normal state projection matrix for projection operation have been synthesized, said method comprising the steps of:
generating an input image vector by vectorizing at least a partial region of an input image;
determining a variation attribute by detecting a variation of a target object from a specific state in the input image; and
selecting one of the plurality of synthesized projection matrices based on the variation attribute determined in the determining step, and generating a projection vector by performing the spatial transformation and the projection operation on the input image vector, using the selected synthesized projection matrix.

16. An image processing method performed by an image processing apparatus including a holding unit configured to hold a spatial transformation matrix for spatial transformation, said method comprising the steps of:
generating an input image vector by vectorizing at least a partial region of an input image; and
generating a transformed image vector by performing the spatial transformation, using the spatial transformation matrix,
wherein in the spatial transformation matrix,
rows correspond to elements of the transformed image vector,
elements of the rows correspond to elements of the input image vector, and
in each row, only elements that are referenced when calculating an element value corresponding to the transformed image vector have a value indicating a reference ratio, and the other elements all have a value of 0.

17. An image processing method performed by an image processing apparatus including a holding unit configured to hold a deformation matrix so as to transform a deformed image into a non-deformed image, said method comprising:
generating an input image vector by vectorizing at least a partial region of an input image; and
generating a transformed image vector by transforming the input image vector using the held deformation matrix,
wherein the deformation matrix includes a reference ratio of an element in the deformed image when calculating an element value corresponding to the element in the deformed image.

* * * * *